US011715385B2

(12) United States Patent
Morris et al.

(10) Patent No.: US 11,715,385 B2
(45) Date of Patent: *Aug. 1, 2023

(54) SYSTEMS AND METHODS FOR AUTONOMOUS CREATION OF PERSONALIZED JOB OR CAREER TRAINING CURRICULA

(71) Applicant: BRIGHTMIND LABS INC., Palo Alto, CA (US)

(72) Inventors: Edward Fritz L. Morris, Palo Alto, CA (US); Pramod Cherukumilli, Belmont, CA (US)

(73) Assignee: Brightmind Labs Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/460,801

(22) Filed: Aug. 30, 2021

(65) Prior Publication Data

US 2021/0390871 A1    Dec. 16, 2021

Related U.S. Application Data

(63) Continuation of application No. 15/917,490, filed on Mar. 9, 2018, now Pat. No. 11,107,363.

(Continued)

(51) Int. Cl.
| | |
|---|---|
| *G09B 5/00* | (2006.01) |
| *G09B 5/12* | (2006.01) |
| *G09B 7/02* | (2006.01) |
| *G06F 16/2455* | (2019.01) |
| *G06F 16/2457* | (2019.01) |

(Continued)

(52) U.S. Cl.
CPC ........... *G09B 5/12* (2013.01); *G06F 16/2455* (2019.01); *G06F 16/24578* (2019.01); *G09B 7/02* (2013.01); *G09B 5/065* (2013.01); *G09B 19/00* (2013.01)

(58) Field of Classification Search
CPC ............. G09B 5/00; G09B 5/12; G09B 19/00
See application file for complete search history.

(56) References Cited

U.S. PATENT DOCUMENTS

| | | |
|---|---|---|
| 6,146,148 A | 11/2000 | Stuppy |
| 2013/0021346 A1 | 1/2013 | Terman |

(Continued)

*Primary Examiner* — Peter R Egloff
(74) *Attorney, Agent, or Firm* — Aurora Consulting LLC

(57) ABSTRACT

This disclosure provides methods, systems, and storage media for automatically generating curricula. The method is performed by one or more machine learning models and one or more algorithms. The method comprises receiving user input related to a subject matter for learning; searching a database for keywords of material related to the subject matter; generating knowledge areas in response to the keywords of the material; searching one or more databases for modules that include material related to the subject matter in response to the generated knowledge areas; populating a map with the knowledge areas; and associating, in the map, modules with the knowledge areas. The subject matter for learning may comprise career skills, job skills, academic disciplines, or areas of general knowledge. For example, the methods, systems, and storage media may be configured to create personalized curriculum based on career type, industry, company, role, or discipline.

18 Claims, 21 Drawing Sheets

Related U.S. Application Data

(60) Provisional application No. 62/469,525, filed on Mar. 10, 2017.

(51) Int. Cl.
 *G09B 5/06* (2006.01)
 *G09B 19/00* (2006.01)

(56) References Cited

U.S. PATENT DOCUMENTS

| | | | |
|---|---|---|---|
| 2014/0186813 A1* | 7/2014 | Noronha | G09B 5/08 |
| | | | 434/350 |
| 2014/0255895 A1 | 9/2014 | Shaffer et al. | |
| 2014/0272892 A1 | 9/2014 | Rozycki et al. | |
| 2015/0242979 A1* | 8/2015 | Abts | G06Q 50/2057 |
| | | | 705/328 |
| 2016/0259858 A1 | 9/2016 | Vittorio | |
| 2017/0011643 A1 | 1/2017 | Wang et al. | |
| 2018/0068576 A1 | 3/2018 | Calmon et al. | |
| 2018/0090021 A1 | 3/2018 | Kenthapadi | |
| 2018/0182255 A1* | 6/2018 | Chen | G09B 7/02 |

* cited by examiner

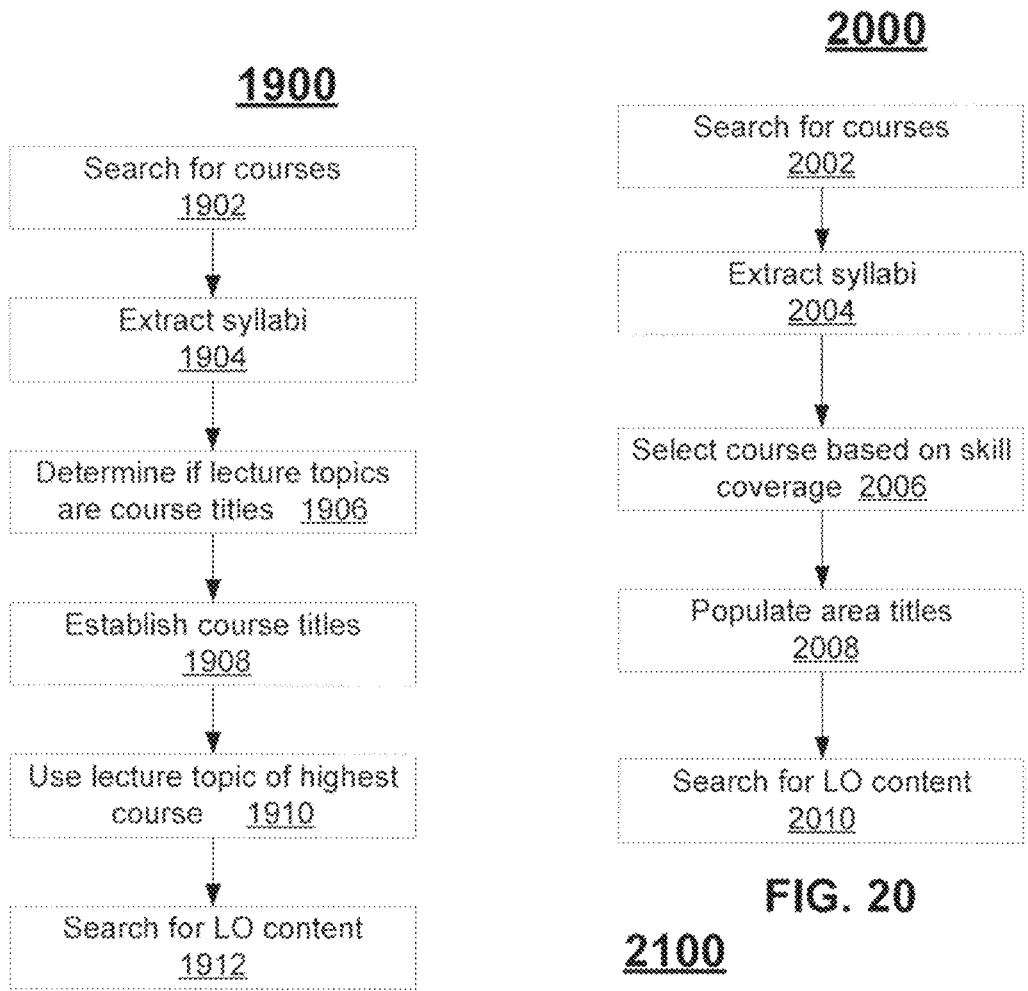
FIG. 19
FIG. 20
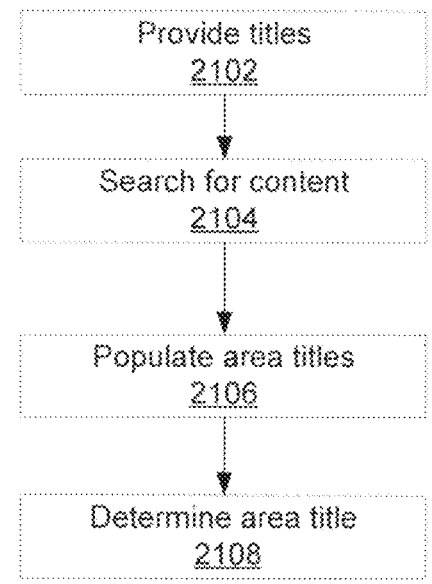
FIG. 21

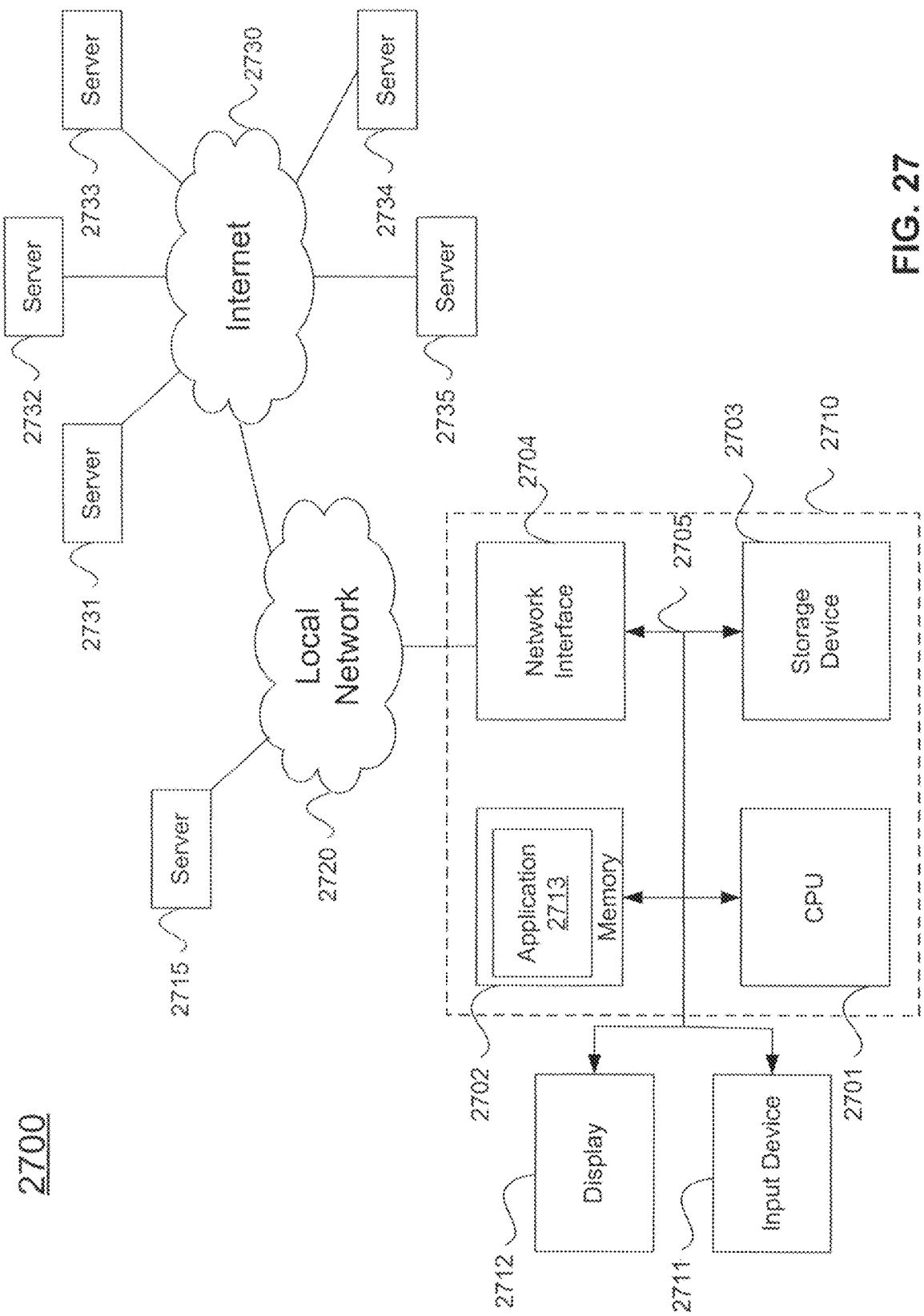

SYSTEMS AND METHODS FOR AUTONOMOUS CREATION OF PERSONALIZED JOB OR CAREER TRAINING CURRICULA

RELATED APPLICATION

This application is a continuation of U.S. patent application Ser. No. 15/917,490, filed Mar. 9, 2018, which claims the benefit of U.S. Provisional Patent Application Ser. No. 62/469,525, filed Mar. 10, 2017, both of which are herein incorporated by reference in their entireties.

FIELD

The disclosure relates to the autonomous curation of educational content and curriculum to generate personalized, self-updating curricula.

BACKGROUND

Online learning has progressed significantly in recent years to the point where it is now possible for thousands of learners to access a particular course or piece of learning content simultaneously. Products in this space fall generally into one of three categories:

(a) MOOCs (Massively Open Online Courses) are full courses open to thousands of learners based on a traditional single-instructor pedagogical structure. Content is recorded and managed by one or more instructors online.

(b) On-demand Video Platforms allow learners to engage passively online with pre-recorded content. These platforms are typically subscription based.

(c) Individual Assessment Platforms. Learners view a list of static instructional content and are challenged with questions from community experts.

MOOCs, On-demand Video, and Assessment Platforms provide value to learners in that these platforms enable multiple learners to engage with online content simultaneously and provide access to a wider learning community. However, these platforms are limited in several ways. First, these platforms do not provide comprehensive content related to a given topic. It is prohibitively time consuming for individual learners who want comprehensive training to locate and organize content elements and combine these into a cohesive whole. Second, content and curriculum sources are limited to the internal staff of the host company, or to that firm's expert community. Learners are forced to trust the content they are consuming is relevant and current, when in fact, most online content is incomplete, and much of it is outdated. Third, content and curriculum is not personalized. The product categories listed do not customize content to fit the interests or background of individual learners. Fourth, the content and curricula in MOOC and On-Demand platforms is expensive to produce. When online learning products adhere to a single source model, each course or object produced is expensive to produce and to maintain since content must be manually updated periodically. The cost of production is passed on to the learner, making the completion of any significant amount of sequential content out of reach of economically underserved audiences. Fifth, learners in all of the above product categories are, in large measure, isolated—they don't have a personal connection to the content, and they have minimal access to instructors, mentors, and peers.

What is needed is a system and method for an online educational platform that provides learners with content that is organized according to reasonable learning pedagogy, comprehensive in scope, always current, personalized to learners, affordable (particularly to underserved markets), and characterized by learner-community engagement and intimacy.

SUMMARY

The disclosure relates to the autonomous curation of educational content and curriculum to generate personalized, self-updating curricula, or "knowledge maps" (map) for any learning subject. In some embodiments, the disclosure provides for sourcing topical content and, based on machine and community inputs, organizing the topical content into interactive visual taxonomies or curricula according to pedagogical order and relevance in a way that is personalized to individual learners. A map shows learners comprehensive content and use cases by subject. Maps are autonomously generated from open, community, and partner content sources based on initial learner inputs, including interests and experiential background. Maps are further curated by ratings and questions and answers (Q&A) generated by a peer and expert community. This two-stage curation process, first by machine and then by community, ensures knowledge maps are persistently updated with the most recent innovations in any field of knowledge.

The disclosure provides for a method, system, and storage medium for automatically generating a curriculum. In one embodiment, the method comprises receiving user input related to a subject matter for learning; searching a database for titles of educational material related to the subject matter; generating areas of education in response to the titles of the education material: searching the database for modules that include education material related to the subject matter in response to the generated areas of education; populating a map with the areas of education; and associating, in the map, modules with the areas of education.

In one embodiment, the method comprises: searching a database for a plurality of content elements including education content related to a module that is associated with a module title corresponding to a user subject matter input; populating a map with the modules; and associating the plurality of content elements with a corresponding module to form a learning object for each file.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

FIG. 19 is a flow diagram of a process as an alternative process to the process of FIG. 18 according to some embodiments.

FIG. 20 is a flow diagram of an alternative process to the process of FIG. 18 according to some embodiments.

FIG. 21 is a flow diagram of a process for generating a map of FIG. 2 for casual or general knowledge according to some embodiments.

FIG. 27 is a block diagram illustrating hardware of a special purpose computing machine according to some embodiments.

DETAILED DESCRIPTION

Various embodiments of the present invention are now described with reference to the figures where like reference numbers indicate identical or functionally similar elements. Also in the figures, the left most digits of each reference number corresponds to the figure in which the reference number is first used.

Platform

Figure 1:
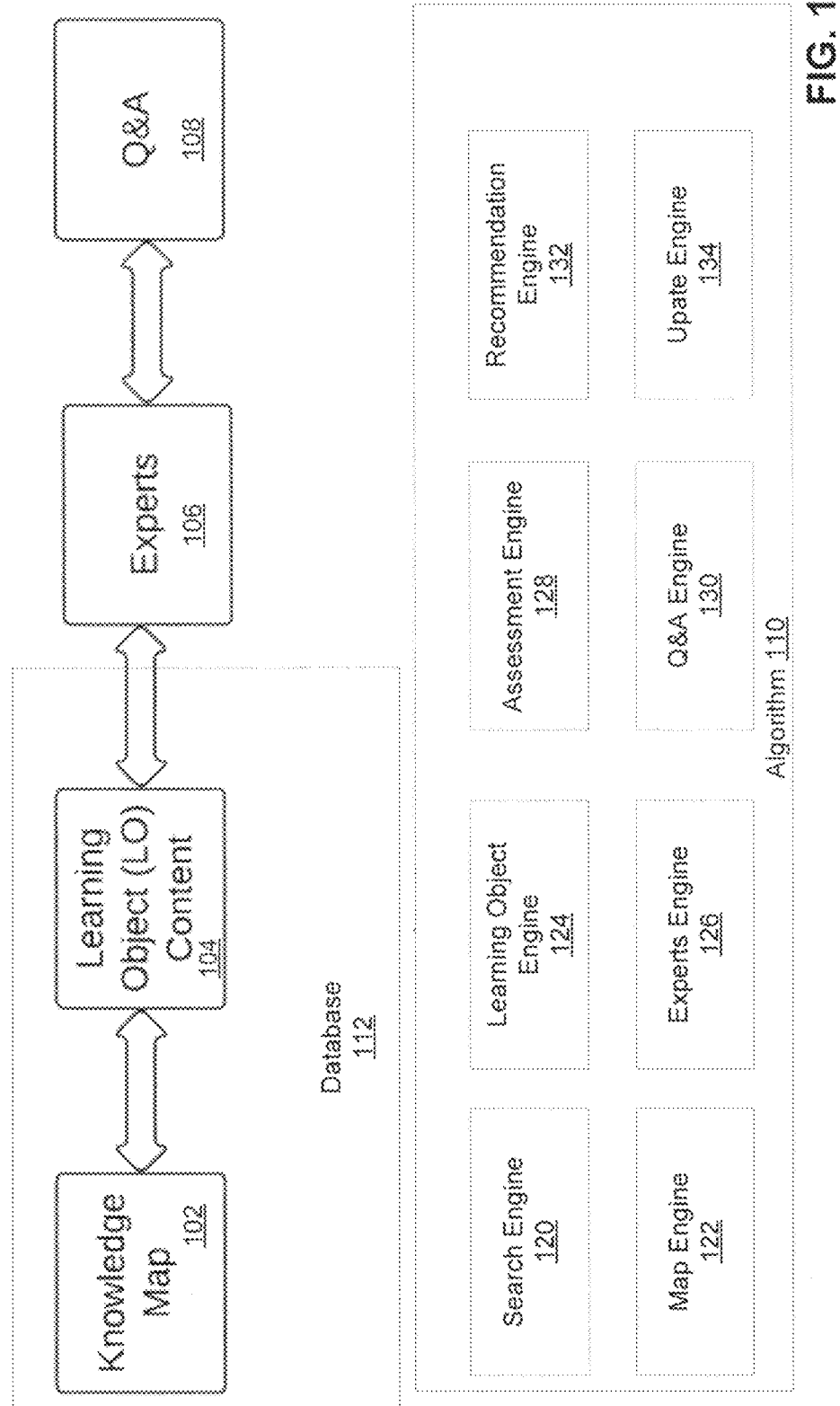
FIG. 1 is a block diagram illustrating a learning platform according to some embodiments.

FIG. 1 is a block diagram illustrating a learning platform 100 according to some embodiments. The learning platform 100 comprises a map 102, a learning object content module 104, an experts module 106, a question and answer (Q&A) module 108, and an algorithm 110. In some embodiments, the map 102 and the learning object content module 104 are stored in a database 112, such as a Mongo database collection.

As an example, the map 102 is described as a knowledge map 102 that is a comprehensive learning framework that is a visual representation of all the individual learning elements used to build mastery in a particular subject. This subject can be, for example, a career, academic discipline, or area of general knowledge. The platform 100 populates the knowledge map 100 with "learning objects" (LO) that may be, for example, bite-sized learning content (5-10 minutes or less if video or audio, 1,000 words or fewer if text). Learning is augmented by inclusion of the user of the platform (also referred to as "learner" herein) in the experts module 106 (e.g., a community of peers and experts) who help the learner via the Q&A module 108 with questions and answers that are related to any map 102 or learning object. Although the platform 100 is described for users that are learners, users of the platform 100 can include educators, teachers, instructors (such as those associated with an institution or freelance), or trainers (such as corporate trainers) that can create customized or personalized curriculum based on career type, industry, company, or role.

Peers and experts in the platform 100 also create learning objects, curate maps 102, and provide ratings for maps 102, learning objects, and Q&A responses.

The platform 100 automates the sourcing and organization of instructional content into a learning framework or curriculum, the map 102, and personalizes content to individual learners based on their interest and background. The platform 100 provides access to effective, low-cost, practically-focused post-secondary and professional instruction to a global audience.

The algorithm 110 autonomously generates the maps 102 per learning subject that are comprehensive in scope, sequenced according to learning pedagogy, and personalized to reflect customized the learner's interests. Algorithm-based curation is enhanced via crowd-based feedback loops whereby content is vetted and improved upon by an external networked community (community) of experts and learner peers. Experts and peers answer learner questions and contribute original content to the platform 100 thus constantly updating the maps 102.

Based on learner inputs, the algorithm 110 generates the maps 102 for any subject, whether related to academic, professional, or casual learning. For instance, a learner may enter inputs that guide the algorithm 110 to build a map 102 for intermediate calculus. Or, a learner may prompt the algorithm 110 to generate a map 102 showing the skill requirements for a career in product marketing in the energy sector. The algorithm 110 is scalable in the number of maps 102 that the platform 100 can produce. Maps 102 can be general in nature, covering broadly all facets of a particular discipline or career. Or, a map 102 can be customized to the background and interests of a user.

In various embodiments, differentiated characteristics of the algorithm 110 and platform 100 include:

(1) Automated content sourcing and organization into learning pedagogies (curricula): Maps 102 are constructed and populated with relevant content in an automated manner by the algorithm 110.

(2) Comprehensive topical content: Maps 102 are structured to encompass all instructional facets of a subject necessary for mastery.

(3) Personalization of content. Map structure and the associated content are curated based on specific Learner interests and background.

(4) Consistently accurate and current content: The combination of machine and community curation consistently and autonomously updates map structure and content. Maps 102 represent a plurality of community opinion regarding what the most accurate and current content is related to a given subject.

(5) Low cost to Learner: because the platform 100 minimizes reliance on manual internal curation, and instead relies on machine and Community self-curation of content and maps 102, the cost of building and maintaining the content base is low. This allows reduced prices to consumers.

(6) Learner intimacy: because knowledge maps 102 are personalized to each user, learners feel more engaged with the content. Moreover, the platform 100 reduces learner isolation by encouraging them to build "Teams" (Team)—small groups of peers and topical experts—for every map 102. These team members are dedicated to helping their fellow team members succeed.

In various embodiments, benefits to the learner of the algorithm 110 and the platform 100 include:

(1) Enhanced subject exploration. Learners explore topical learning paths (career, research, DIY, academic) more rapidly and more thoroughly than other systems.

(2) Time savings in self-education: Learners save time exploring and mastering content over traditional methods or online resources like search engines, or online encyclopedias.

(3) Faster mastery of subjects. Because content is comprehensive and personalized, learners maintain their interest and more effectively retain knowledge.

(4) Localization of content by region. The algorithm 110 automatically sources content from local sources first, before then searching more widely.

(5) Rapid scalability. Because content is not reliant on only a single content source, and because the maps 102 are generated autonomously, the platform 100 can more rapidly scale than traditional MOOCs or On-demand Platforms. The constant expansion of the Platform's Map database 112, and growth of the Community supporting each map 102 results in a richer experience for the individual learner.

(6) Lifetime individual value. Because the maps 102 automatically update to reflect the state-of-the-art content in any field, the maps 102 provide a lifelong reference for Learners to stay at the cutting edge of their knowledge field.

(7) Increased Learner intimacy and inclusion: Learners are encouraged to join Teams, help fellow students, and contribute quality answers and content to the platform 100. All of these activities reduce Learner isolation and increase Learner intimacy.

As described in more detail below, the platform 100 leverages a combination of internal company input, community input and, machine-based algorithm data manipulation to automatically populate knowledge maps 102 that are comprehensive in topical scope and personalized to each user's specific interests, for an unlimited number of careers, subjects and knowledge areas.

Knowledge Map

Figure 2:
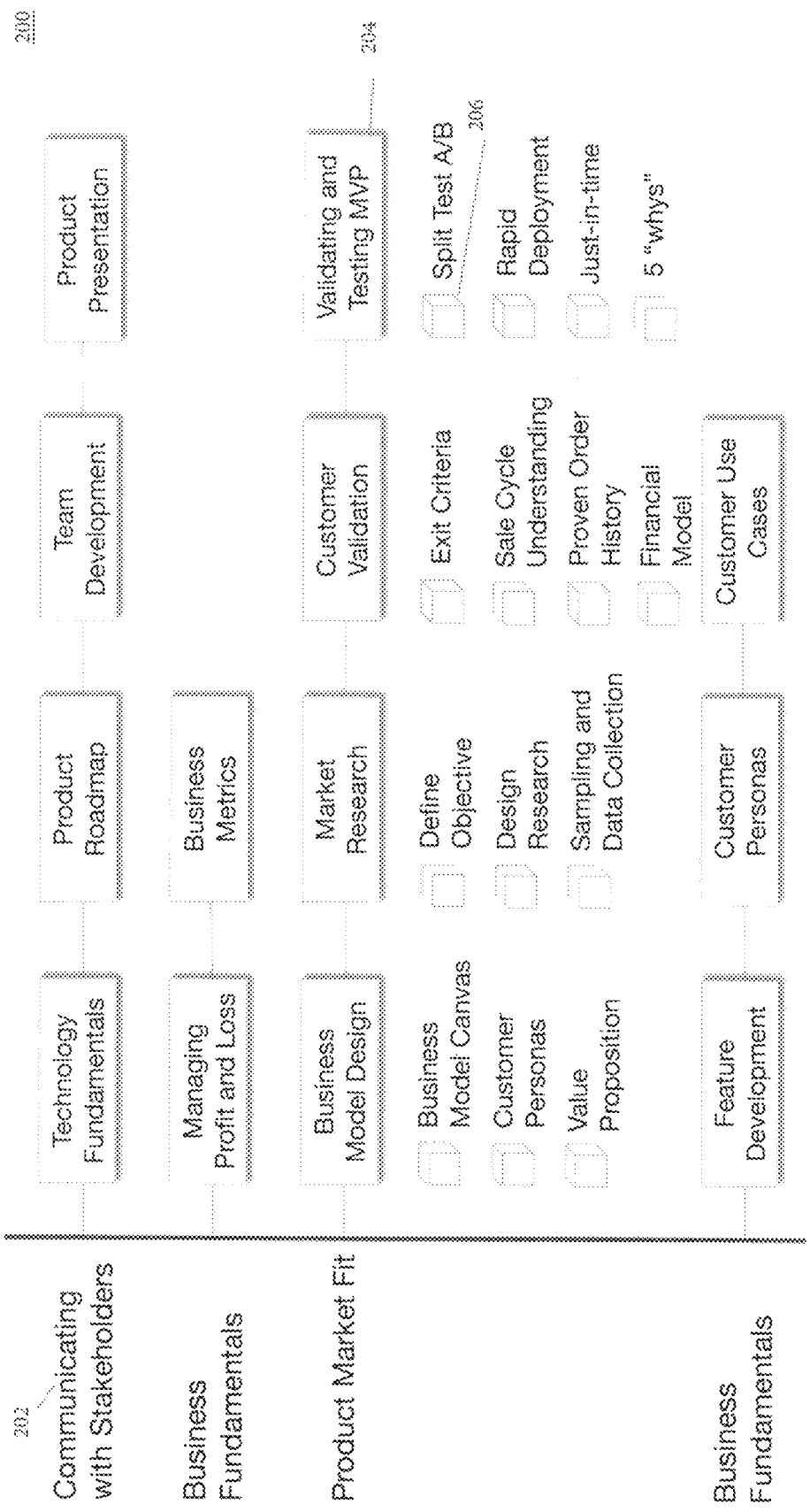
FIG. 2 is a block diagram illustrating a knowledge map of the learning platform of FIG. 1 according to some embodiments.

FIG. 2 is a block diagram illustrating the knowledge map 102 of the learning platform 100 according to some embodiments. In this example, the knowledge map 102 is a partial product management map. The hierarchy of the map 102 includes a plurality of high-level areas ("areas") 202 located on the left-hand-side of FIG. 2 and a plurality of detailed modules ("modules") 204 positioned on the right-hand-side of FIG. 2. Each area 202 is associated with one or more modules 204. Each module 204 includes one or more learning objects (LOs) 206, such as are listed below each module 204 in the Product-Market Fit Area 202. The learning object 206 may be for example video, audio or text. For the sake of clarity and simplicity, reference numbers are shown in FIG. 2 for only one area 202, one module 204, and one learning object 206.

The maps 102 are designed to provide life-long access to learners, who may frequently reference a map 102 to remind themselves of core skills they at one time learned. Because the maps 102 are continuously updated by the algorithm 110 and by community input and ratings such as described below, the learners may also use the maps 102 to inform themselves of the latest advances in a given field of knowledge.

It is noted that the learning objects 206 may be from different information providers or sources. The algorithm 110 uses the map 102 to create linkage between learning objects 206 from multiple sources. For example, a map 102 for learning accounting may include a lecture on taxation from Haas School of Business and a lecture on depreciation from Anderson School of Business, because different lecturers may provide better lectures for their field of expertise. The number of sources for learning objects 206 that are used for a map 102 may be very large. The algorithm act 110 can extract learning objects 206 from a large number of sources and by learning itself can make better extractions for later maps or updated maps.

Algorithm

Referring again to FIG. 1, the algorithm 110 comprises a content engine 120 for conducting searches of the database 112 and the Internet and processing the results of the searches. The algorithm 110 further comprises a map engine 122 for generating the knowledge map 102.

The knowledge map 102 may be populated by the process described below in conjunction with FIG. 22 for all types of maps. The knowledge map 102 may be populated by the process described below in conjunction with FIGS. 6-12 for an academic map. The knowledge map 102 may be populated by the processes described below in conjunction with FIGS. 13-20 for a career map. The knowledge map 102 may be populated by the process described below in conjunction with FIG. 21 for a casual learning or general knowledge map 102.

The algorithm 110 further comprises a learning object engine 124 for generating learning objects. For all map types (e.g., career, academic, casual, general knowledge, and the like), the learning object engine 124 sources learning objects 206 in a variety of multi-media. Using the extracted module titles (or in some cases, areas titles), the algorithm 110 crawls video repositories (e.g., YouTube or Vimeo), audio repositories (e.g., SoundCloud), and open text sources (e.g., OpenStax) to find content related to Module titles. In some embodiments, the learning object engine 124 filters all crawled content before the algorithm 110 provides the content to the user of the platform 100. In various embodiments, although content sources may change, the learning object engine 124 applies the same methodology to all map types.

The algorithm 110 provides the learner with a predetermined number of learning objects, such as the top three highest ranked learning objects 206 (e.g., based on the filters). Upon request, the learner can look at all the learning objects 206 and rate them based on his or her preferences. The learning objects 206 shown in the platform 100 are displayed in the sequence of the learning object titles.

The learning object engine 124 executes a relevance algorithm to find content that is relevant to the module 204 (e.g., the process described below for FIG. 23) and rank the content (e.g., the process described below for FIG. 24) to determine the content that is used as a learning object 206. The learning object engine 124 filters the ranked results of the relevance algorithm to further reduce the number of content elements that are to be associated with a learning object 206. The filtering may be, for example, the process described below for FIG. 25.

The algorithm 110 categorizes content for creating learning objects 206. For example, learning object content viewed by the users on the platform 100 is categorized into learning content and use case content.

The algorithm 110 uses a supervised machine learning model (e.g., SVM, Naïve Bayes, Logistic Regression) to categorize relevant videos into tutorials, conference/use case talks, or other.

The algorithm 110 relies on training data from a training set that encompasses content across a variety of subjects. Initially, the training data starts with a predetermined number (e.g., 100) videos in each category. In various embodiments, the algorithm 110 uses unsupervised, semi-supervised, or supervised machine learning, or a combination thereof, to analyze additional content to generate update the training set. As it learns, the algorithm 110 adds its initial output data into the training data, thereby training itself and autonomously producing increasingly accurate results. In some embodiments, the algorithm's accuracy, autonomous nature, and scalability 110 is further enhanced by increasing the accuracy of video and audio transcription (either via company-driven innovation or by utilizing open source transcription solutions), and by applying deep learning tactics that reduce the algorithm's reliance on video or audio file transcription of training data. Deep learning tactics involve knowledge map and LO feature learning: identifying and categorizing map and content features (characteristics of audio or video content) that can be used in lieu of, or in combination with, text features generated via a machine learning model. For instance, neural networks are be used to prepare or transform audio data that is then analyzed by an algorithm like the Hidden Markov Model to analyze key words and phrases and produce more accurate transcription. Moreover, in some embodiments, deep neural networks or deep symbolic networks, which utilize multiple "hidden" layers of analysis and classification to approximate human cognition of map and LO features, are used to obviate the need for manual feature manipulation, thereby unlocking further automation and scalability.

The algorithm 110 trains the model using such features as (a) title contains tutorial, chapter, introduction, and the like; (b) title length; (c) video/Audio length; (d) content category; (e) description; (f) description length; (g) the frequency of views (e.g., few, medium, many); (h) number of occurrence of certain words in comments, title and, description (e.g., course, lecture, professor, case study, presentation, webinar, training); and (i) number of comments.

Many module titles (e.g., Text Classification, a title in the Data Science Map) cover multiple topics (for instance, Text Classification would cover topics like Naïve Bayes, Multinomial Naïve Bayes, Precision, and Recall). For module titles that cover multiple topics, the content found on the web can be overly long (1 hour+ video or audio or 10 pages+ of text). Based on proven cognitive theories of learning, the learning object engine 124 looks for content that is short (e.g., 5-10 minutes of audio/video or 1000 words of text) and when the learning object engine 124 is not able to find short content, the learning object engine 124 slices or parses the content into smaller LO content segments. Depending on the content length associated with the Module title, either the module title is used as the learning object title, or learning object titles are extracted by slicing the content (such as the process of FIG. 26).

The algorithm 110 further includes an experts engine 126 that communicates with a community of peers and experts communicate via the experts module 106 of the platform 100 to rate the maps 102 and the learning objects 206 created by the algorithm 110. The algorithm 110 further includes an assessment engine 128 to measure every aspect of the learner and expert interaction with the platform 100 and with each other to improve the ability of the platform 100. For instance, learning object content selection and map structure are directly influenced by the metric of user ratings (upvotes) and views. The algorithm 110 further comprises a Q&A engine 130 that incorporates learning content with the Q&A associated with the content via the Q&A module 108. The algorithm 110 comprises a recommendation engine 132 for generating recommendations of maps 102, areas 202, modules 204, or learning objects 206 based on user input or past user behavior. The algorithm 110 further comprises an update engine 134 for controlling searches and updating the map 102.

The database 112 may also store benchmark data that serves as content that has been reviewed by experts or others and thus has known attributes. The algorithm 110 can use the benchmark data for analyzing areas 202, modules 204, learning objects 206, or maps 102 that are created or being created so that the new areas 202, modules 204, learning objects 206, or maps 102 can be assessed based on the benchmark. The learner may be unaware of the existence of the benchmark. As the platform 100 learns from its creations of new maps 102, the benchmark may be used less or not at all. Benchmarks may be established for areas 202, modules 204, learning objects 206, or maps 102 for specific subjects. The processes described herein may be performed with or without using the benchmark.

Figure 3:
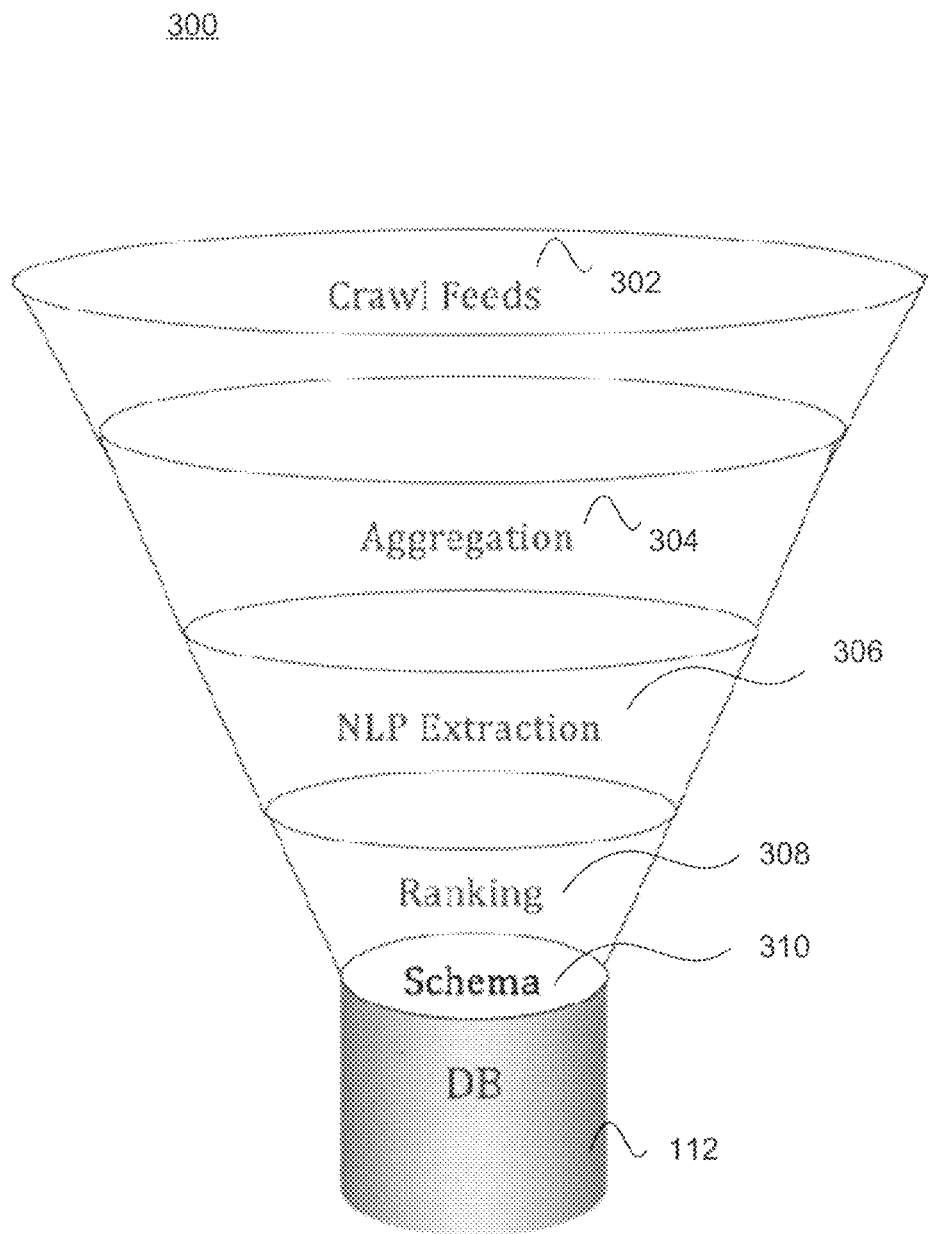
FIG. 3 is a flow diagram of a process for creating a map of FIG. 2 according to some embodiments.

FIG. 3 is a flow diagram of a process 300 for autonomously creating a structure of the map 102 according to some embodiments.

Based on initial learner profile inputs, the algorithm 110 creates the map 102 by first creating the structure of the map (the areas 202 and the module titles 204) and then populating this structure with LOs 206. The algorithm 110 does so by first crawling 302 a variety of sources, such as the Internet, partner databases, and its own Community-generated content e.g., for four elements. Sources for the map area, module, and learning object title construction may also include educational institutions, user-generated content, individually-generated training content on the Internet or in a privately held database, corporate training content.

The first element is titles that define the areas to be populated. Depending on the nature of the map 102, sources may include job listings, open source academic content, titles of corporate training content, titles of instructional multimedia content online, or titles of any other training or learning content. The second element is curricula that provide the titles to the areas 202. Depending on the nature of the map 102, sources for these frameworks may include academic curricula, books chapters, course titles, career skills, curricula from online learning sources, or curricula generated by individuals unaffiliated with a company or university. The course titles used could be from courses taught in academic offline or online setting or from courses taught by other online sources. The third element is syllabi that provide sequencing structure through module titles 204. Depending on the nature of the map 102, sources for these frameworks may include academic syllabi, books sub-chapters, lecture series, sequenced learning pathways from online sources. The fourth element is learning objects 206 that populate each module 204. Depending on the nature of the map 102, sources may include open source online video Platforms, institutional partner learning content, or Community-generated content.

The algorithm 100 aggregates 304 the collected data from the crawling 302 and extracts 306 the relevant content from the data. In some embodiments, the algorithm 110 extracts 306 using natural language processing (NLP). The algorithm 100 ranks 308 the extracted data, such that the most highly desired structure and related content combine to make up a complete map 102 related to a given subject. The algorithm 110 stores the information in the database 112 so that the information can be displayed to a user using a mobile or a web application.

The maps 102 in the platform 100 take the form of different "Map Types". Map Types may be, for example, career, academic, casual, and general knowledge. Depending on the motivation of the learner, the algorithm 110 may execute additional steps to accurately source and structure the desired Map Type. The specifics of two Map Types, Career and Academic, are described in the sections below. The data sources crawled for the feeds at the top of the funnel will be defined based on the output desired. Examples for data sources include (but are not limited to) job postings, academic curriculum, video or audio repositories, and proprietary content from partner institutions or companies.

Figure 4:
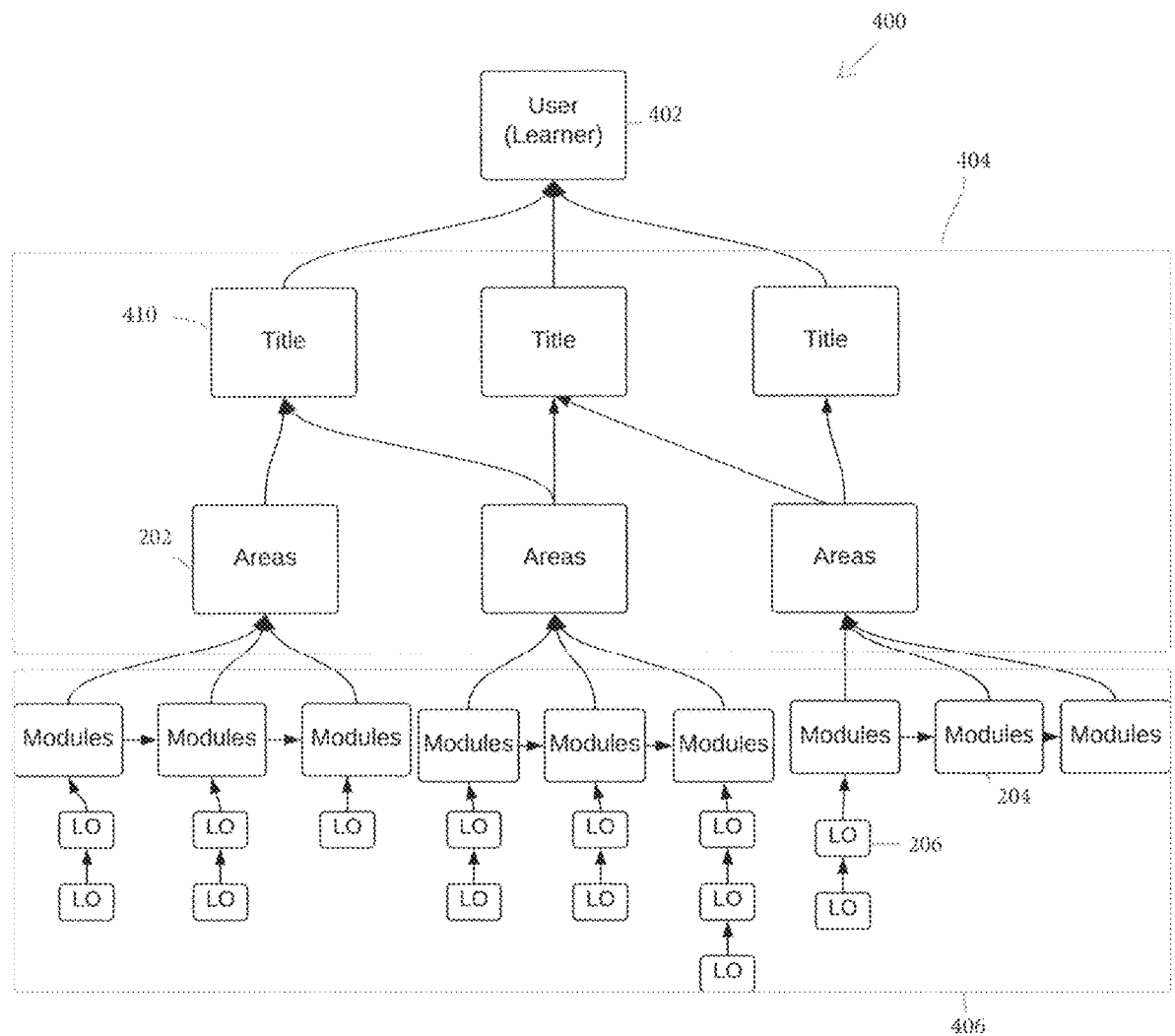
FIG. 4 is a diagram illustrating a map of FIG. 2 according to some embodiments.

FIG. 4 is a diagram illustrating a map 102 according to some embodiments. In some embodiments, the schema of the map 102 is applied to all map types used in the platform 100. The map 102 comprises an area schema 404 and a module schema 406. The individual elements of area schema 404 may vary depending on the type of knowledge map 102 a user (or learner) 402 desires to build. As an example, the learner 402 can choose a title 410 (e.g., a career title such as "Social Media Marketing Manager" or an academic title such as "Biology"). Based on the title 410 chosen, the algorithm 110 populates the appropriate areas 202. For the sake of clarity and simplicity, reference numbers are shown in FIG. 4 for only one area 202, one module 204, one learning object 206, and one title 410.

The module schema 406 comprises a plurality of modules 204 and learning objects 206. In some embodiments, a learning object (LO) is the fundamental learning component of the platform 100. Learning objects 206 are associated with modules 204.

The modules 204 and learning objects 206 are structured in the module schema 406 based on the areas 202 and the titles 410 of the area schema 404. In various embodiments, the module schema 406 relies on one or more of a variety of content feeds. One example is academic syllabi from universities. The algorithm 110 populates the modules 204 by searching, aggregating, and extracting modules titles from syllabi related to the same area 202. Then, the algorithm 110 populates the modules 204 with learning objects 206, for example crawling Internet content repositories (such as Youtube) for multimedia content (including audio, video, and text), as well as partner repositories, and repositories of content contributed by Community members.

Figure 5:
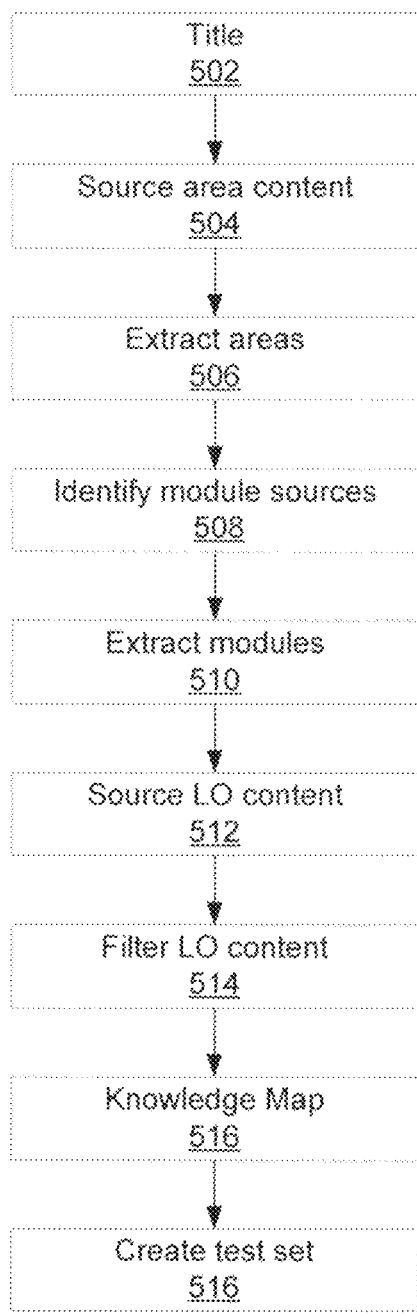
FIG. 5 is a flow diagram of a process for creating of a map of FIG. 4 according to some embodiments.

FIG. 5 is a flow diagram of a process 500 for creating of a map 102 according to some embodiments. The steps of the process 500 may be adjusted or customized according to the type of map 102. In some embodiments, the algorithm 110 populates the elements of the map 102 using the process 500.

During area title creation, the algorithm 110 receives 502 a title from the learner. The algorithm 110 aggregates 504 area content from a variety of sources (e.g., career titles or a university major titles) and extracts 506 area titles.

During module segmentation, the algorithm 110 determines what content is to be assigned to a module. The algorithm 110 determines whether an area can be broken into smaller modules. The algorithm 110 identifies 508 the sources (like academic or professional course syllabus, lecture series, and individual lectures) containing the Modules.

During module title creation, the algorithm 110 crawls 510 module sources for syllabi, lecture series or individual lectures for Module titles. The algorithm 110 aggregates 512 module titles when possible, and extracts the module titles from the sources. If the module titles cannot be aggregated (or, in some embodiments, if the algorithm 110 only finds one module title), then the algorithm 110 extracts 512 the module from the most reputed source. The algorithm 110 may determine the most reputed source by the benchmark stored in the database 110. Sources for module titles can come from university syllabi, university lecture pages, corporate training syllabi, or syllabi from any open source on the internet. The reputation of the source is determined based on the following: University sources are given the highest reputation score (based on general university ranking from sources like USNews), other open source syllabi (including online teaching sites) would be next in reputation and their reputation will be based on the Google search rank.

During learning object extraction, the algorithm 110 extracts 514 LO titles from the content associated with modules. Content may be sources from text, video, or audio sources on the Internet, from institutional partners, and from the Community. Learning objects 206 may also be obtained by slicing module content into bite-sized elements. The algorithm 110 filters 516 the learning object content based on, for example, the reputation of the provider, the relevant of the content, duplication of content, and the like. The algorithm 110 populates 518 the knowledge map 102 with the filtered learning object content.

Academic Map

Figure 6:
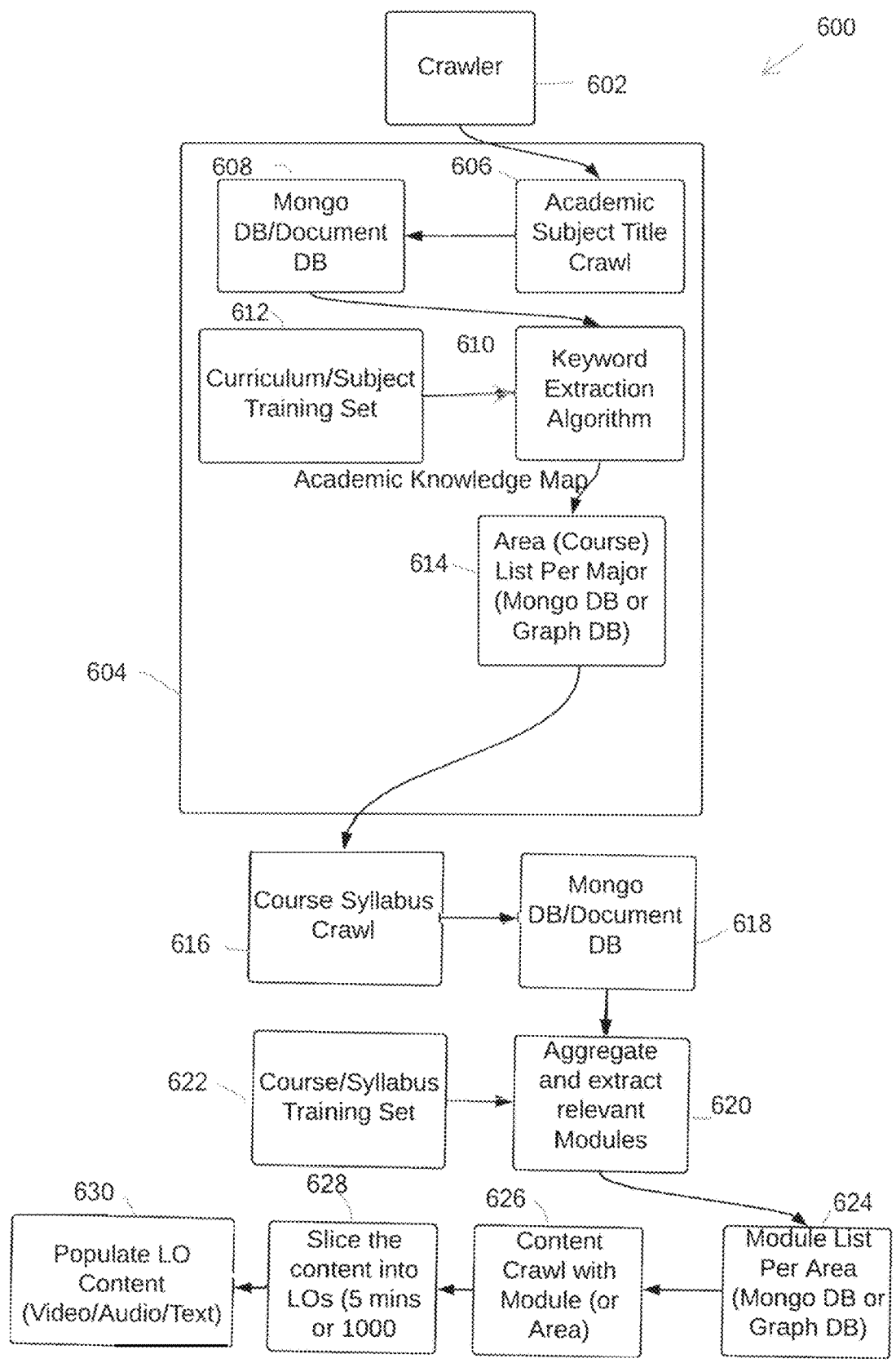
FIG. 6 is a flow diagram of a process for creating of an academic map as an illustrative example of the map of FIG. 4 according to some embodiments.

FIG. 6 is a flow diagram of a process 600 for creating of an academic map as an illustrative example of the map 102 of FIG. 4 according to some embodiments.

The process 600 illustrates the details of the algorithm 110 for a map that is an Academic Knowledge Map (such as a Biology Map). This Map populates the Map database via two scenarios: 1) A Learner inputs his or her interests into the Platform, and this prompts Map creation. 2) This Map is added to the database as part of the automatic Map generation process based on internal inputs. Internal inputs are specifications to build a particular type of map for a target audience input by company platform managers. These inputs are identified by monitoring community activity and conducting platform user surveys, and by researching and surveying non-platform learners and experts to determine the topics, modules, and areas in which they are most interested.

The algorithm 110 constantly creates and updates maps by crawling 602 for major titles. If a map 102 is already populated in the database 112, the updated, current version of the map 102 is displayed to the learner. The academic map is one of several map types that the algorithm 110 generates. A second map type, a career map, is described below in conjunction with FIG. 13. The type of map created depends on the expressed interests of the learner or internal inputs by a platform administrator.

To create an academic map 102 (via learner input or via the automatic generation process), the feed that populates titles in the schema is the academic major curriculum feed from universities that lists the course titles associated with a given academic major. The algorithm 110 populates areas 202 in this case by retrieving the different academic courses (aggregated across universities) taught under each major. The population of modules 204 is described below in conjunction with FIG. 11. The population of learning objects 206 is described below in conjunction with FIG. 23

The algorithm 110 crawls 602 to create 604 areas 202. To create areas 202, the algorithm 110 crawls 606 academic major titles in academic sources, such as the academic major curriculum feed from universities that lists the course titles associated with a given academic major, and stores 608 the titles in the database 112. The algorithm 110 extracts 610 keywords using 612 curriculum/subject training set. The curriculum/subject training set is a database created manually by experts in a given career or field. It is generated by asking a group of at least three experts to generate a list of areas titles (and in other cases module and learning object titles). The algorithm 110 generates 614 an area or course list per major and stores the list in the database 112.

With the area list, the algorithm 110 crawls 616 course syllabi for modules 204 for the area 202 and stores the modules 204 in the database 112. The algorithm 110 aggregates and extracts 620 relevant modules relying on 622 a manually generated course/syllabus training set for reference. The algorithm 110 generates 624 a module list per area from the extracted relevant modules. The algorithm 110 crawls 626 content with the module or area keywords to locate learning objects. The algorithm 110 slices 628 the crawled content into learning objects 206. The slicing 628 may be done, for example, by the slicing process of FIG. 26. In some embodiments, the learning objects 206 are limited in size, such as duration (e.g., 5 minutes) or length (e.g., 1,000 words). The algorithm 110 populates the learning content 206 into the map 102.

Figure 7:
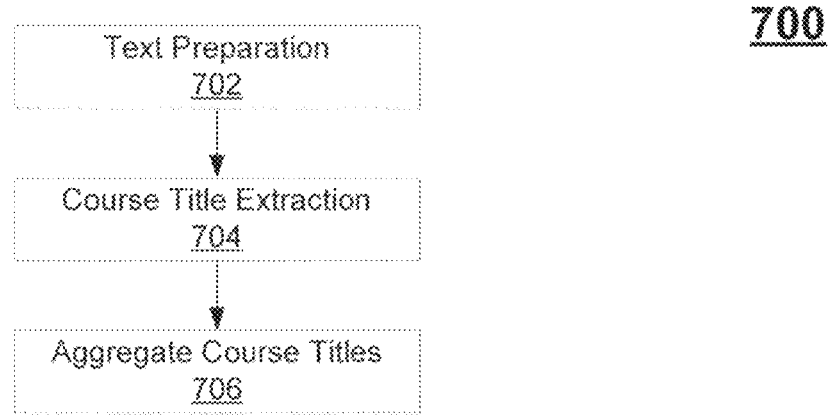
FIG. 7 is a flow diagram of a process for extracting of academic areas from a map as an illustrative example of the process of FIG. 6 according to some embodiments.

FIG. 7 is a flow diagram of a process 700 for extracting of academic areas from a map as an illustrative example of the process 600 of FIG. 6 according to some embodiments. The Academic Map starts with a search of academic titles—(e.g., Physics, Mathematics, or Computer Science)—that would typically be part of an academic curriculum. The components of the Academic Map are roughly analogous to the hierarchy of a university major curriculum: areas (courses), modules (lectures) and Learning objects (lecture topics). The process to create the Areas in an Academic Map is next described.

The algorithm 110 prepares 702 text for extracting an academic map area.

Figure 8:
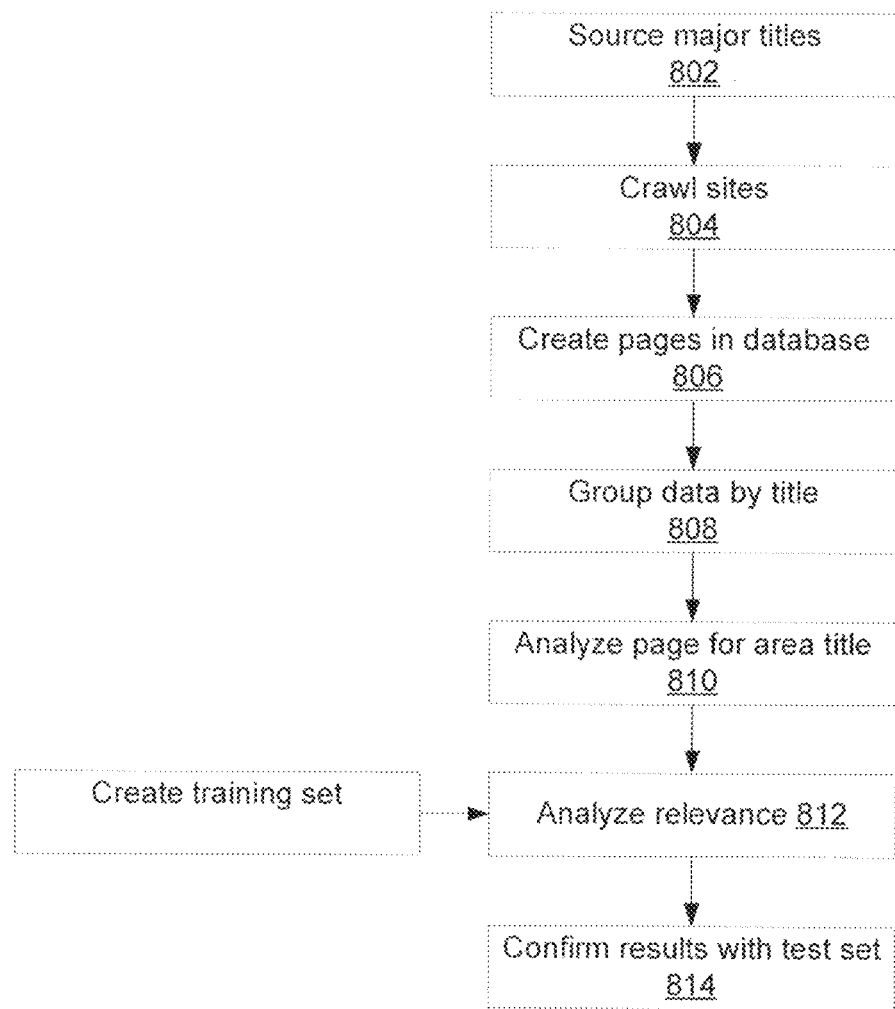
FIG. 8 is a flow diagram of a process for text preparation of the map creation of FIG. 7 according to some embodiments.

FIG. 8 is a flow diagram of a process 800 for text preparation 702 of the map creation of FIG. 7 according to some embodiments. To train the supervised model, a training set is created by experts who understand academic degrees and course pages for different academic degrees. This training set includes webpages with course listings that shows the relevant courses for a few academic degrees. The training set is used in the process 800 to train the machine learning model. The algorithm 110 sources 802 the list of major titles from university websites based on academic majors. In some embodiments, users of the platform 100 can add major titles in which they are interested. For each Map title (e.g., Biology or Mechanical Engineering), the algorithm 110 crawls 804 a plurality of university sites (e.g., MIT.edu or Harvard.edu) for pages that list courses for each college major. After crawling, the algorithm 110 creates 806 the web pages in the database 112. The algorithm 110 groups 808 all data according to map title in the database 112. The algorithm 110 analyzes 810 each crawled page to ensure that the page has sufficient text to extract Area (course) titles. Each page should have at least 500 words to be considered efficient. The algorithm 110 analyzes 812 the relevance of the pages by applying a machine learning model (e.g., a Naïve Bayes based supervised machine learning model) to ensure that crawled university pages have relevant course listings. The algorithm 110 confirms 814 the results with the test set. The test set is used to confirm the results of the search and analysis performed with the training set.

Referring again to FIG. 7, the algorithm 110 extracts 704 course titles.

Figure 9:
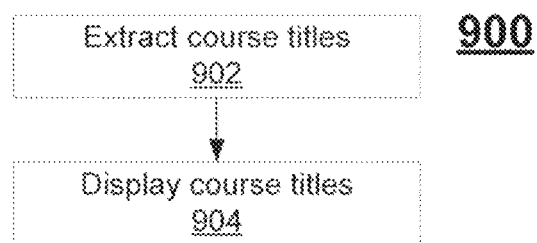
FIG. 9 is a flow diagram of a process for course title extraction of the map creation of FIG. 7 according to some embodiments.

FIG. 9 is a flow diagram of a process 900 for course title extraction 704 of the map creation of FIG. 7 according to some embodiments. From each of the documents (e.g., HTML Page, PDF, Microsoft Document) stored in the database 112, the algorithm 110 extracts 902 course titles. The algorithm 110 prepares 904 for display the course titles in a page. The course titles may be presented in a few formats such as a table, or as plain text with titles in bold (as headers). In some embodiments, the algorithm 110 uses an open source table extraction algorithm (such as Tabula or Beautiful Soup) to extract tables and identify course titles. For plain text, headers (either in bold or with section numbers) are identified to extract course titles.

Referring again to FIG. 7, the algorithm 110 aggregates 706 course titles.

Figure 10:
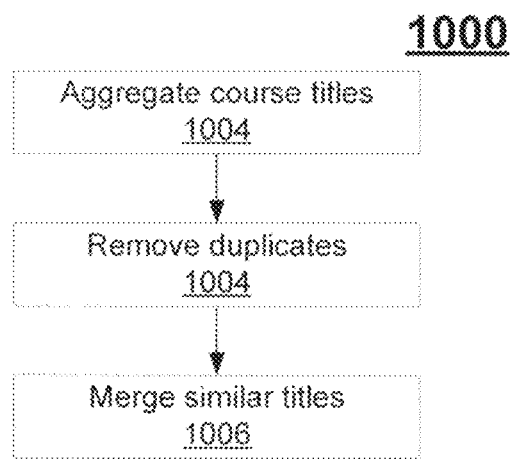
FIG. 10 is a flow diagram of a process for aggregating course titles of the map creation of FIG. 7 according to some embodiments.

FIG. 10 is a flow diagram of a process 1000 for aggregating 706 course titles of the map creation of FIG. 7 according to some embodiments. The algorithm 110 aggregates 1002 all the course titles across similar curricula under each map title 410. The algorithm 110 removes 1004 duplicates among the course titles. The algorithm 110 merges 1006 similar titles using an algorithm such as a frequent pattern mining algorithm.

Referring again to FIG. 7, the algorithm 110 completes the process 700.

Figure 11:
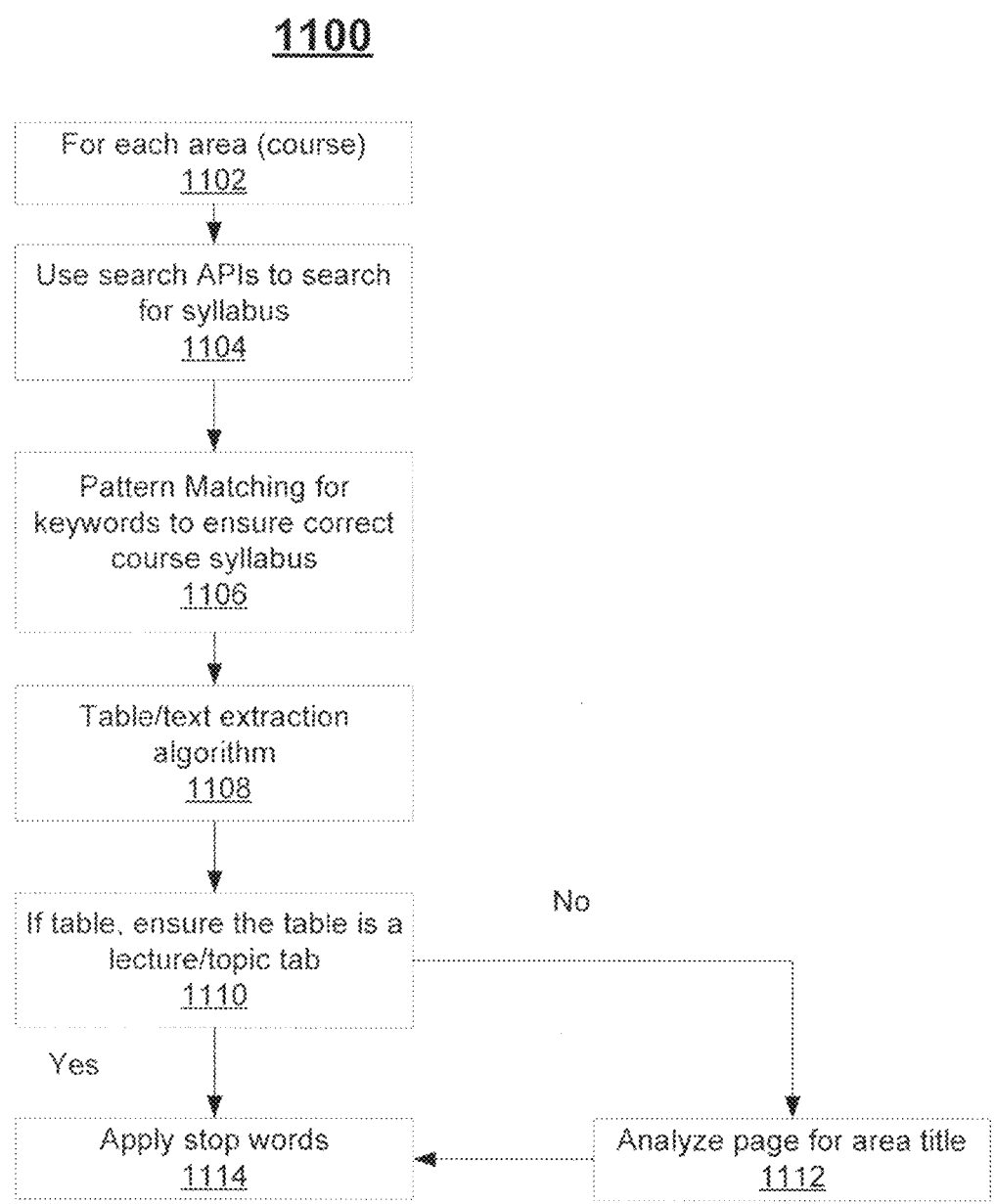
FIG. 11 is a flow diagram of a process for extracting modules from areas of a map creation according to some embodiments.

FIG. 11 is a flow diagram of a process 1100 for extracting modules 204 from areas 202 of a map creation according to some embodiments. Modules 204 are extracted from several sources including course syllabi (if a syllabus is available for a particular area 202), online lecture series, learning pathways from online sources, and book chapters. Most of the academic syllabus pages either list syllabi in a table or highlighted text.

The algorithm 110 may apply a machine-learning model to ensure that crawled syllabus pages are relevant to the course (course relevance model). The algorithm 110 relies on a training set to train the model.

The algorithm 110 executes 1102 the process 1100 for each academic area (or course in an academic map), The algorithm 110 uses 1104 search APIs to search for syllabi related to the academic area. The algorithm 110 determines 1106 pattern matching for keywords to ensure the course syllabus is appropriate for the academic area. The algorithm 110 executes 1108 a table or text extraction algorithm to exact tables or text from the syllabus. If table is extracted, the algorithm 110 ensures 1110 the table is a lecture or topic table. If text is extracted, the algorithm 110 extracts lecture topics from the text. The algorithm 110 applies 1114 stop words.

A merge of syllabi is next described for the creation of the academic map.

Figure 12:
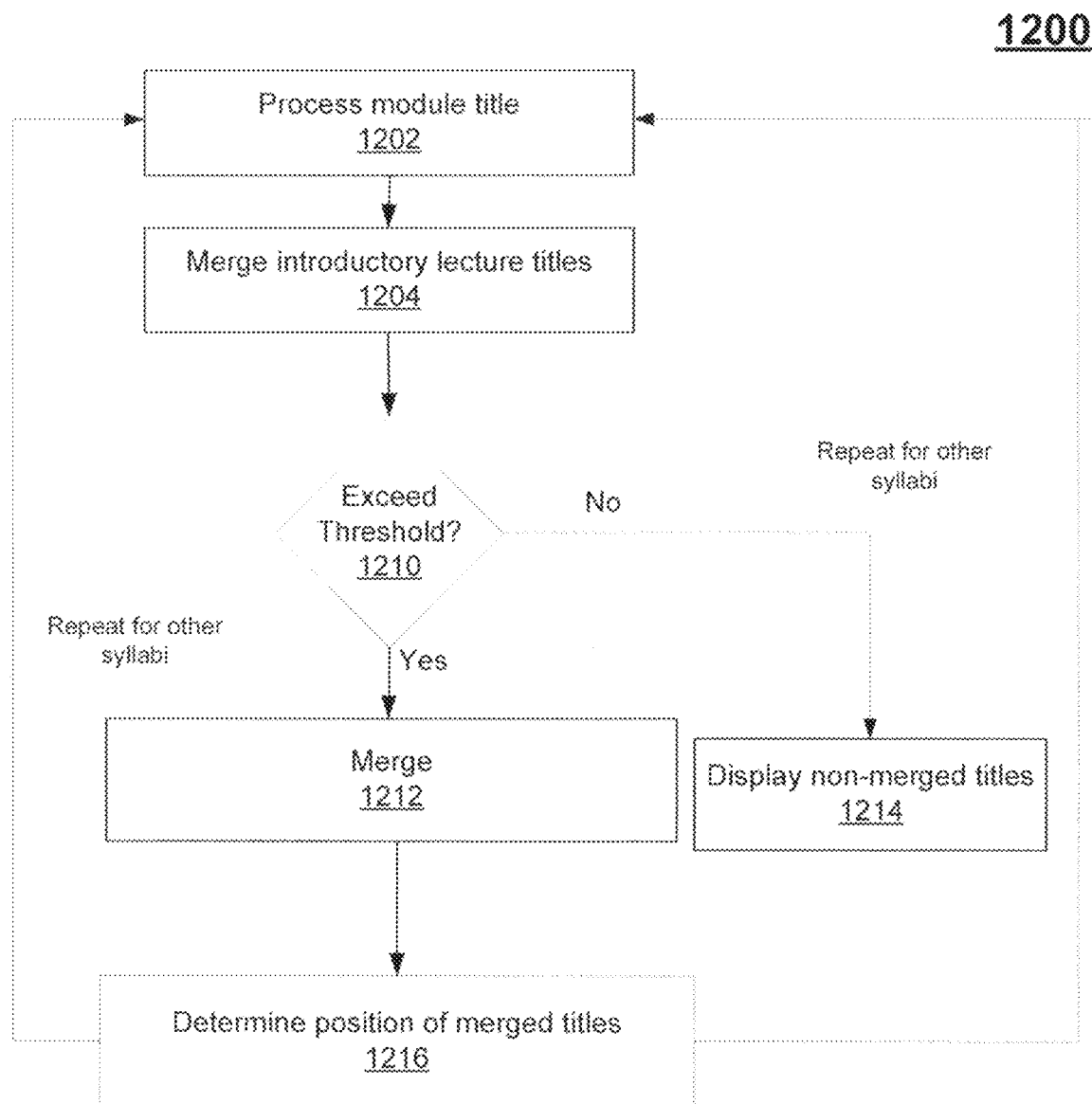
FIG. 12 is a flow diagram of a process for merging syllabi for map creation of FIG. 6 according to some embodiments.

FIG. 12 is a flow diagram of a process 1200 for merging syllabi for map creation of FIG. 6 according to some embodiments. All the module titles are extracted for each course using syllabi, lecture series, or lecture topics from a variety of sources, including universities, corporate training, and online courses. Syllabi are merged to obtain the best possible set of Module titles. Modules are kept in sequence so that the learner can engage with the subject in the correct sequence.

Prior to merging, the algorithm 110 processes 1202 the module titles by stemming each extracted Module title, removing stop words, and removing numbers and special characters. The algorithm 110 merges 1204 the titles of introductory lectures in each syllabus. In various embodiments, any title containing "intro", "overview", "introduction" and the like are merged into one title. This merged title is placed in a position (e.g., position 1) of the output and forms the module title or learning object title. Utilizing the first non-introductory title from syllabus A (row 1 or 2 in source A), the algorithm 110 compares 1210 the modules to determine a measure of the similarity between two syllabi. In one embodiments, the algorithm 110 obtains 1210 a dice coefficient with titles in syllabus B using the equation:

$$\frac{2(\text{words } A \text{ intersect words } B)}{|\text{words } A| + |\text{words } B|}$$

The dice coefficient determines the common lecture topics from different sources that can be used in the final module or learning object list.

The algorithm 110 determines 1210 whether the two syllabi are sufficiently similar. In one embodiment, the determination is whether the score of the dice coefficient exceeds a threshold (e.g., 0.5). If the threshold is exceeded (e.g., the score is greater than 0.5), the algorithm 110 merges 1212 the titles. Otherwise, if the threshold is not exceeded, (e.g., the score is not greater than 0.5), the algorithm 110 displays 1214 as described below. The algorithm 110 repeats the processes 1202, 1204, and 1210 for other syllabi. The algorithm 110 displays 1214 the titles that are not merged at the bottom of the results (titles from lower ranked syllabi are discarded). The algorithm 110 determines 1216 the position of displaying the merged titles, such as obtaining the average row position for each merged module title. In one embodiment, the algorithm 110 displays the final output in ascending order.

Alternatively, the algorithm 110 may create an academic knowledge map from non-academic sources. With the Academic Major title, instead of using academic course titles, the algorithm 110 crawls online sources like MOOCs or OpenStax or Wikipedia or other curriculum sources to extract the Area titles based on the curriculum listed. Next, the algorithm 110 uses the curriculum listed to extract content from non-academic online sources that have lecture series or lecture topics to extract the module and learning object titles.

Career Knowledge Map

Figure 13:
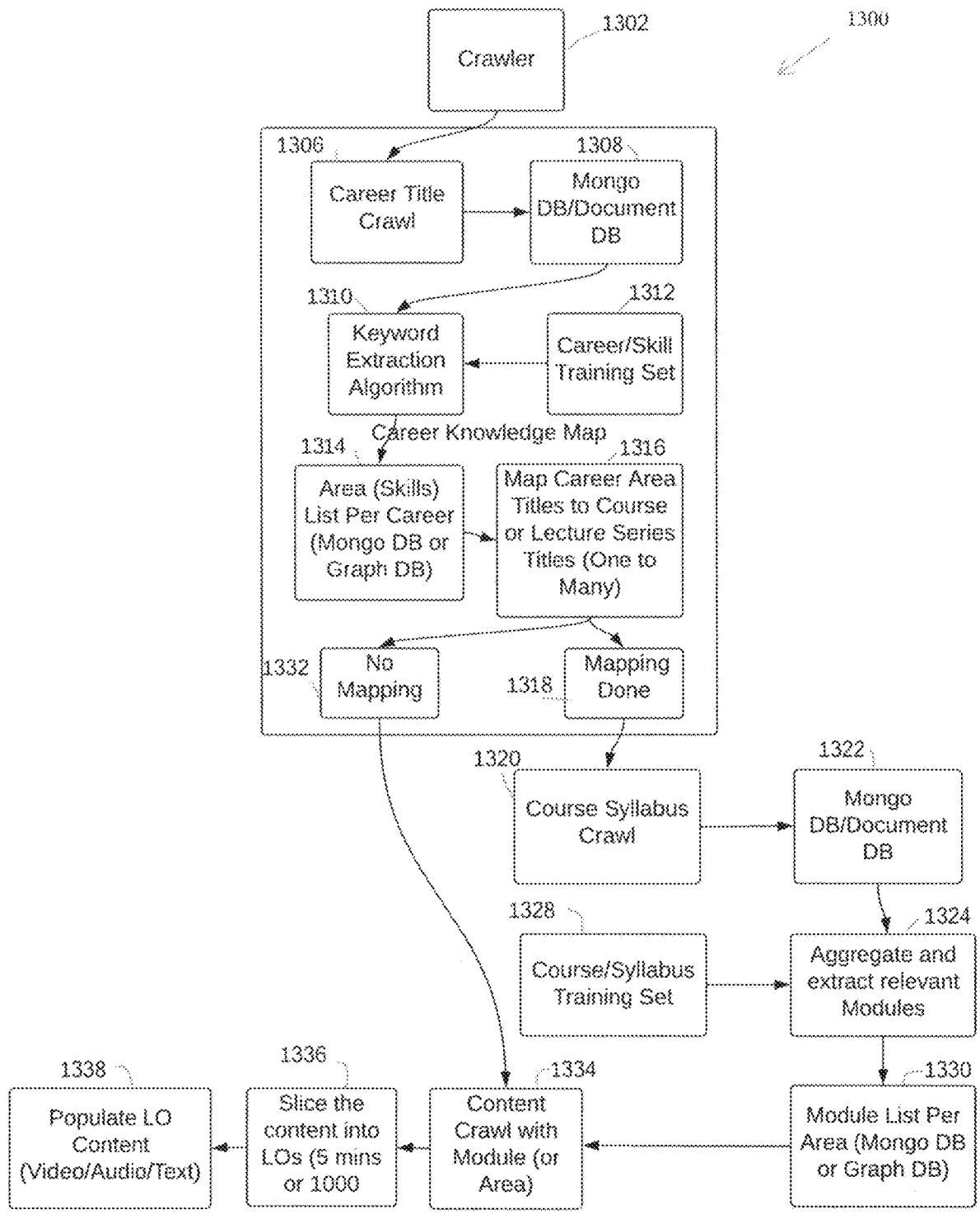
FIG. 13 is a flow diagram of a process for creating of an academic map as another illustrative example of the map of FIG. 4 according to some embodiments.

FIG. 13 is a flow diagram of a process 1300 for creating of an academic map as another illustrative example of the map 102 of FIG. 4 according to some embodiments. The process 1300 illustrates the details of the algorithm 110 for a map 102 that is a career knowledge map (such as a data scientist map). If the learner is interested in a career map, the feed that populates Area titles (in the case of automatic Map generation) would include online job search websites like Indeed.com and simplyhired.com. Like the academic map, the career map is a case application of the algorithm 110 already proven effective in trials. Like the academic map described above, the career map 102 is also populated either via input from the learner, or through the automatic map generation process by the algorithm 110.

In this example, the areas 202 are populated by extracting required job skills from different job descriptions for each career. These job skills are then mapped to the highest rated curricula. Career maps may rely on academic sources for curricula. Other potential sources of curricula include corporate or institutional partner curricula, open curricula online, and curricula developed by community members.

In terms of learner experience, a learner interested in exploring a career in data science is shown a map 102 informed by current data scientist job listings.

The algorithm 110 constantly creates and updates Maps by crawling 1302 for career titles. If a map 102 is already populated in the database 112, the updated, current version of the map 102 will be displayed to the learner.

The algorithm 110 crawls 1302 to create 1304 career areas 202. To create areas 202, the algorithm 110 crawls 1306 job descriptions and job postings, and stores 1308 the jobs in the database 112. The algorithm 110 extracts 1310 keywords relying on 1312 career and skill training sets to generate a career knowledge map. The algorithm 110 generates 1314 an area or skills list per career and stores the list in the database 112.

With the career list, the algorithm 110 maps 1316 the career area title to a course or lecture series titles. If mapping is complete 1318, the algorithm crawls 616 course syllabi for modules 204 for the corresponding area 202 and stores 1322 the modules 204 in the database 112. The algorithm 110 aggregates and extracts 1324 relevant modules 204 informed by 1328 the course/syllabus training set. The algorithm 110 generates 1330 a module list per area from the extracted relevant modules. The algorithm 110 crawls 1334 content with the module or area keywords to locate learning objects. The algorithm 110 slices 1336 the crawled content into learning objects 206. The slicing 1336 may be done, for example, by the slicing process of FIG. 26. In some embodiments, the learning objects 206 are limited in size, such as duration (e.g., 5 minutes) or length (e.g., 1000 words). The algorithm 110 populates 1338 the learning content 206 into the map 102.

If no mapping is done 1332 at 1316, the algorithm 110 proceeds to crawl 1334.

The creation of area and module titles in a career map 102 is next described.

Figure 14:
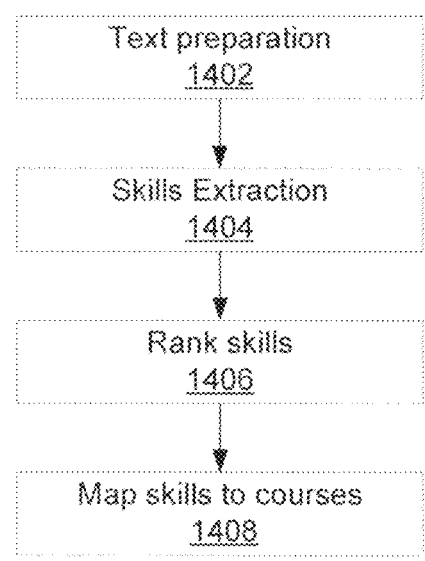
FIG. 14 is a flow diagram of a process for extracting academic areas from a map as an illustrative example of the process of FIG. 13 according to some embodiments.

FIG. 14 is a flow diagram of a process 1400 for extracting academic areas from a map as an illustrative example of the process 1300 of FIG. 13 according to some embodiments. In some embodiments, the map area part of the map creation is different for various map types (such as the map creation described for FIG. 7 for the creation of an academic knowledge map 102. After the map area extraction of process 1400, the algorithm 110 utilizes the module extraction methodology described above in conjunction with FIG. 11 to extract module titles.

The academic map starts with a search of academic titles—(e.g., Physics, Mathematics, or Computer Science)—that would typically be part of an academic curriculum. The components of the academic map are roughly analogous to the hierarchy of a university major curriculum: areas 202 (courses), modules 204 (lectures) and learning objects 206 (lecture topics). Following are the unique steps to create the areas 202 in an academic map.

The algorithm 110 prepares 1402 text for extracting an academic map area.

Figure 15:
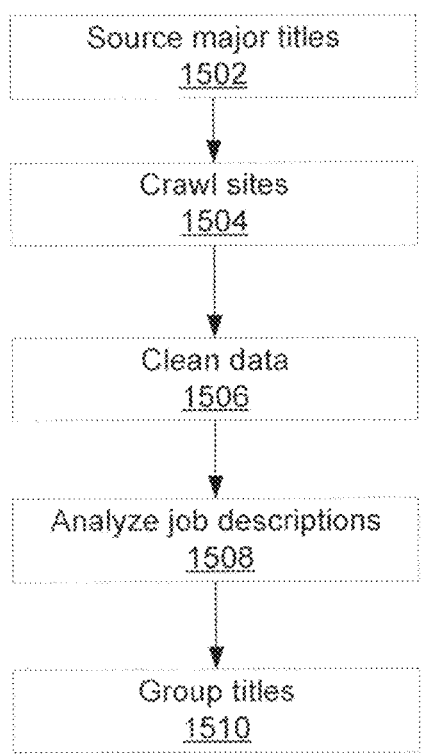
FIG. 15 is a flow diagram of a process for text preparation of the map creation of FIG. 14 according to some embodiments.

FIG. 15 is a flow diagram of a process 1500 for text preparation 1402 of the map creation of FIG. 14 according to some embodiments. The algorithm 110 sources 802 the list of careers from job posting sites (for example, Indeed.com). In some embodiments, users of the platform 100 can add careers in which they are interested. For each career (for example, Product Manager, Data Scientist), the algorithm 110 crawls 1504 a number of job search websites (e.g., Indeed, Simply Hired) for job descriptions. After crawling, the algorithm 110 the algorithm 110 cleans 1506 the data by organizing the data by job title into the database 112 and performing de-duplication to eliminate duplicate entries. The algorithm 110 analyzes 1508 each job description to ensure that the job description has sufficient text to extract by, for example, eliminating job descriptions that are less than an amount of text (e.g., 10 lines of text). In some embodiments, (the number of lines is based on the average number of lines per job. The algorithm 110 groups 1510 together synonym titles (e.g., job titles that rely on similar words). In some embodiments, for every job description, the algorithm 110 spells each word by using lowercase spelling, lemmatizes all words (using vocabulary to bring words to their root form), and stems individual words (heuristic process to bring the words to their root form).

Referring again to FIG. 14, the algorithm 110 extracts 1404 skills.

Figure 16:
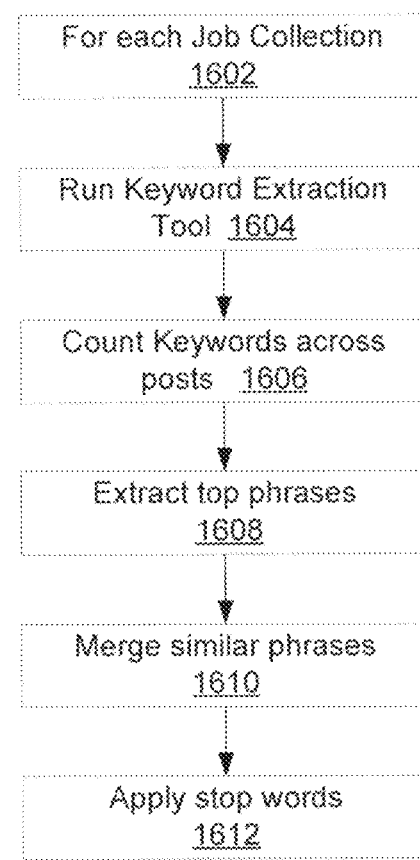
FIG. 16 is a flow diagram of a process for skills extraction of FIG. 14 according to some embodiments.

FIG. 16 is a flow diagram of a process 1600 for skills extraction 1404 of FIG. 14 according to some embodiments. For each job creation 1602, the algorithm 110 runs 1604 an extraction tool. In some embodiments, the algorithm 110 uses Keyword Extraction Libraries, such as Rake, for keyword extraction 1604. The algorithm 110 counts 1606 the keywords across posts and extracts 1608 top phrases from the posts. The algorithm 110 merges 1610 similar phrases between posts. To merge similar phrases, the algorithm 110 uses similarity measures, such as Jaccard or Cosine. The algorithm 110 applies 1612 stop words.

Referring again to FIG. 14, the algorithm 110 ranks 1406 skills.

Figures 17, 18:
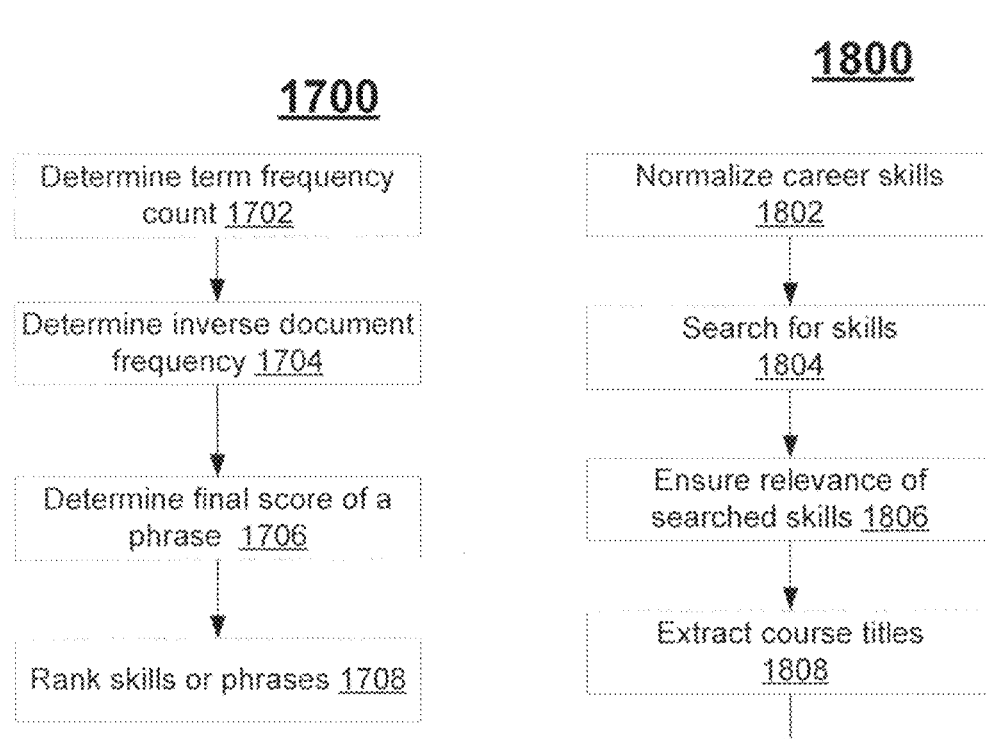
FIG. 17 is a flow diagram of a process for skill ranking of the map creation of FIG. 14 according to some embodiments.
FIG. 18 is a flow diagram of a process for skill mapping of the map creation of FIG. 14 according to some embodiments.

FIG. 17 is a flow diagram of a process 1700 for skill ranking 1406 of the map creation of FIG. 14 according to some embodiments. In one embodiment, the algorithm 110 ranks areas based on the frequency of key words or phrases in the documents. Although the process 1700 is described for skills, the process could be used for elements of a map 102.

The algorithm 110 ranks the skills obtained from the previous step based on their phrase importance measure. In one embodiment, the measure is a TFIDF score (TF→Term Frequency and IDF→Inverse Document Frequency) for every skill. The TFIDF score provides a measure of how important a phrase is to a document in a collection of documents. This measure allows the algorithm 110 to rank the career skills in the order of their importance.

The algorithm 110 determines 1702 a term frequency count, TF(P) which is defined as the count of a phrase P in a current job category (e.g., data scientist) and determines 1704 an inverse document frequency IDF(P)=log_e (total number of skillset sections across job categories, e.g. data scientist, social media manager, divided by the number of skillset section across job categories that contain phrase P). The TFIDF is:

TFIDF=TF*IDF.

The algorithm 110 determines 1706 the final score of a phrase, which is defined as TFIDF score*log_e (number of words)

The algorithm 110 ranks 1708 skills (or the phrases) in the descending order of their final scores.

After the Career skills are extracted, the algorithm 110 maps 1408 the career skills into areas 202.

FIG. 18 is a flow diagram of a process 1800 for skill mapping 1408 of the map creation of FIG. 14 according to some embodiments. The algorithm 110 normalizes 1802 career skills into area titles. This step is used to merge career skills into curricula. The algorithm 110 searches 1804 for syllabi that provide instruction related to a particular career skill using search APIs (e.g., Bing). The algorithm 110 to ensures 1806 that syllabus pages are relevant to the skills being searched (skill relevance model) using a machine learning model. The algorithm 110 extracts 1808 course titles that cover most career skills using frequent pattern mining. These course titles can be from university curricula, corporate training courses, other online Expert sources, or partner databases. For all career skills that are not covered by courses, the algorithm 110 searches 1810 for learning object content. The content can take the form of video, audio, power point slides, text files (including PDF, Word). For example, to find videos, the algorithm 110 looks into video content databases like Youtube and Vimeo for either skill-specific lecture series or for a single video. For skills that are covered by a course title, the algorithm 110 uses 1812 the course title as the area title. For skills that are not covered by the course title, the skill title is used as the Area title and the content (like video, audio, pdf or word document) title is used as the LO title (in this scenario there are not any modules 204). In certain cases, where LO content is either more than 10 minutes, or more than 1000 words, the algorithm 110 slices 1814 content into smaller learning objects (see FIG. 23). The slicing 1814 may be done, for example, by the slicing process of FIG. 26. In these cases, the module title is the title of the original learning object content and the learning object title is the title of the smaller sliced content.

When mapping 1408 career skills to areas 202, for each of the course titles found (using the process 1800), the algorithm 110 determines the number of career skills covered by the courses. The algorithm 110 orders the Areas (courses) for example, top down in the decreasing order of the skill coverage.

Referring again to FIG. 14, the algorithm 110 completes the process 1400.

FIG. 19 is a flow diagram of a process 1900 as an alternative process to the process 1800 of FIG. 18 according to some embodiments. The algorithm 110 searches 1902 using the search APIs to find courses that cover many of the career skills. The algorithm 110 extracts 1904 syllabi from the courses. For each of the lecture topics mentioned in a syllabus, the algorithm 110 searches 1906 using the search API to determine if they are also course titles. If the lecture topics in a course are also course titles, then the course is a higher-level course. The algorithm 110 establishes 1908 the course title of the higher-level course as an area title. The algorithm 110 uses 1910 the lecture topics from a higher-level course as the module titles. The algorithm 110 searches 1912 for learning object content using the module title.

FIG. 20 is a flow diagram of a process 1900 as another alternative process to the process 1800 of FIG. 18 according to some embodiments. The algorithm 110 finds 2002 courses related to the career title using the search APIs (after changing the career title into a subject title, for example Product Manager into Product Management). The algorithm 110 extracts 2004 syllabi from the courses. The algorithm 110 selects 2006 the course that has the most career skill coverage. The algorithm 110 populates 2008 the area titles using the syllabus lecture topics from the course. The algorithm 110 searches 2010 for courses, lecture series, or learning object content using the area titles.

FIG. 21 is a flow diagram of a process 2100 for generating a map 102 for casual or general knowledge of FIG. 2 according to some embodiments. The process 2100 may be used for general knowledge maps or casual learning subjects, such as rock climbing or skiing. For learning subjects that do not fit into career or academic skills, the algorithm 110 receives 2102 titles that are provided by the learners who are interested in casual or general learning. The algorithm 110 searches 2104 for video, audio or text content on the Internet by searching sources like Youtube or Vimeo for lecture series or lecture topic on the casual or general learning topic. Using the lecture series or a lecture topic found, the algorithm 110 populates 2106 area titles. The algorithm 110 determines 2108 the area title. In some embodiments, the learning object title becomes the area title if the content for the area title is bite-sized. And the content associated with the learning object title is populated as the LO content. Based on the area title if the algorithm 110 is able to find more lecture series or lecture topics (additional bite-sized pieces of content) associated with the area title, each of the additional lectures series titles or lecture topic titles becomes the learning object title and content associated with them becomes the learning object content.

Figure 22:
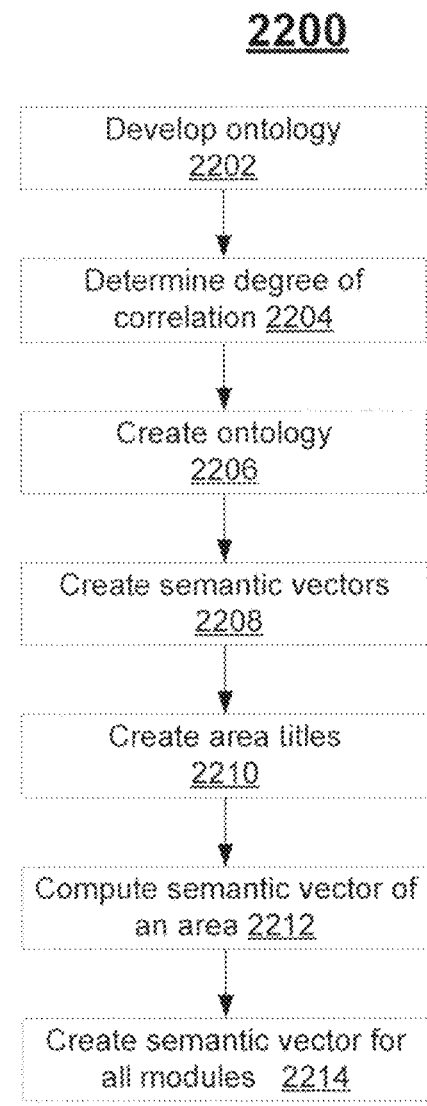
FIG. 22 is a flow diagram of another process for generating a map of FIG. 2 according to some embodiments.

FIG. 22 is a flow diagram of a process 2200 for generating a map 102 of FIG. 2 according to some embodiments. The algorithm 110 develops 2202 ontology or a graph of the individual learning elements (maps 102, areas 202, modules 204 and the learning objects 206), and their relationship with each other. The algorithm 110 determines 2204 the degree of correlation between the individual learning elements. In one embodiment, the strength of the links between the individual elements in the graph represents the degree of correlation between them. The algorithm 110 creates 2206 an ontology or graph using word vectors, word semantics and probabilistic graphical models (for example by looking at the probability of co-occurrence of words or by finding similarities or semantic distance between different learning elements). The algorithm 110 creates 2208 semantic vectors for each learning element. Semantic vectors define the relationship between a learning element to another. The semantic vectors are created by the algorithm 110 using a corpus resource such as Wikipedia. For certain Maps, the algorithm 110 is unable to create semantic vectors (if the corpus resource is not available) to show the best possible areas. In such a scenario, the algorithm 110 creates 2210 area titles. In some embodiments, the area titles are created as follows: for career maps, the algorithm 110 computes area titles by extracting the career skills. For academic maps, the algorithm 110 computes area titles using the course titles. For other maps, the algorithm 110 computes the areas titles by searching for content on the Internet. The algorithm 110 computes 2212 a semantic vector of an area 202 that includes modules 204 using the distance or similarity between the area 202 and the different modules 204. In some embodiments, a first step of the vector computation is to populate a corpus of data on the area 202 from knowledge sources, such as Wikipedia or academic course pages. Using probabilistic graphical models (such as probability of co-occurrence of words) on the data corpus, the algorithm 110 creates 2214 semantic vectors to show all the modules 204 related to an area 202. The algorithm 110 repeats the flow elements 2202, 2204, 2206, 2208, 2210, 2212, and 2214 for the area semantic vector algorithm for each module to populate the semantic vectors for each module 204 to show all the learning objects 206 related to the module 304.

Learning Objects

Figure 23:
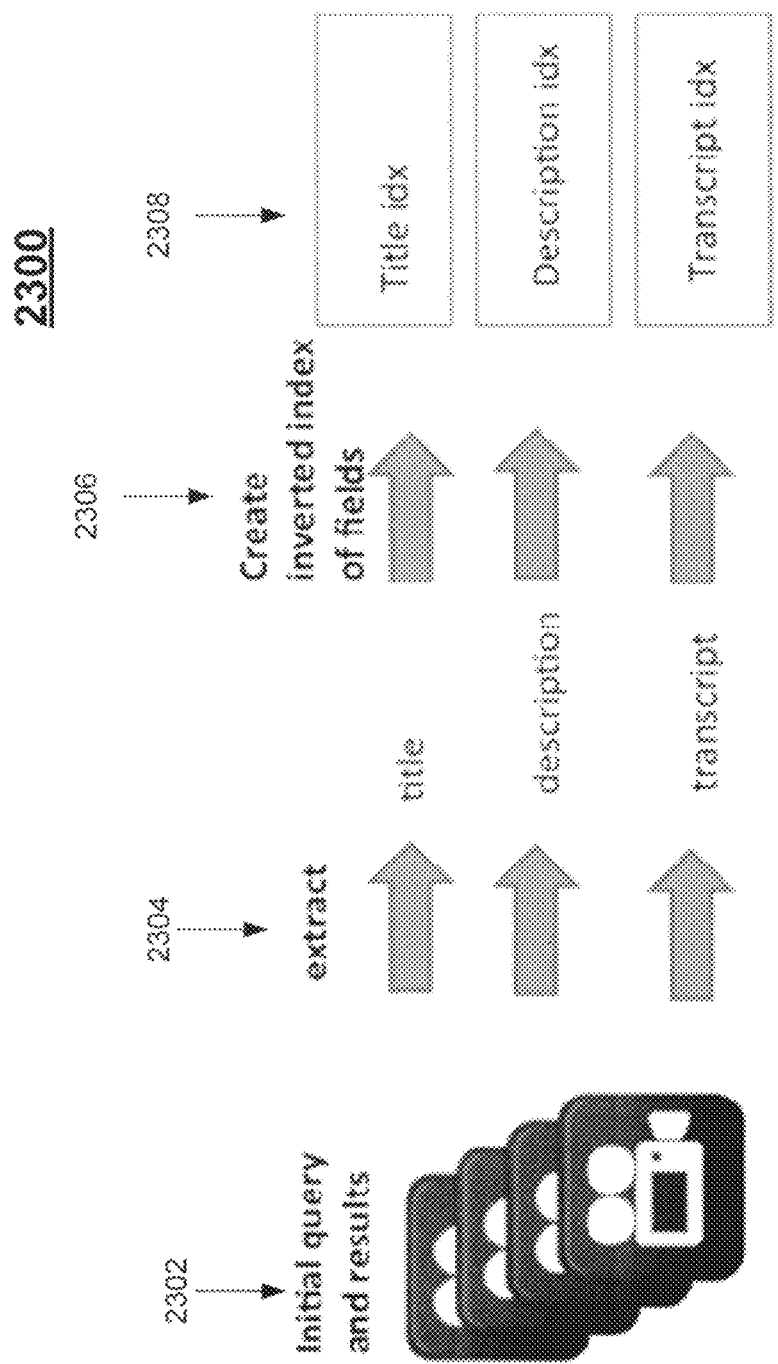
FIG. 23 is a flow diagram of a process for determining relevance of content of the map creation according to some embodiments.

FIG. 23 is a flow diagram of a process 2300 for determining relevance of content of the map creation according to some embodiments. The process 2300 is an example of how the algorithm 110 extracts video from repositories, such as YouTube or Vimeo, by checking if the video is relevant to a title in the map 102. In some embodiments, the same algorithm used to extract video content from video repositories is used to extract audio from audio repositories because the meta data associated with video and audio content is very similar. For text-based file extraction, the relevance algorithm may be the same as audio or video extraction because video and audio relevance is based on text (title, transcript, and description). Video content is converted to text (via transcript) to allow the algorithm 110 to search for relevance.

Initially the algorithm 110 uses 2302 the native search facility initially available through the content repository to find the relevant content. (The term "idx" refers to the inverted index.) After the results are available 2302 from the initial search, the algorithm 110 extracts 2304 the following fields: title, description, and transcript of the video and audio (and meta tags if available). For text, the title is extracted. If there is a short description at the top of the file, the title is used. If not, the entire text is used as the transcript. After title, description, and transcript are available, the algorithm 110 creates 2306 an inverted index for each word in these fields.

For each field (title, description, and transcript), the algorithm 110 creates 2208 an inverted index. The format of the inverted index may be, for example, Format <word>: videoID (count). The inverted index may be, for example, the following"

| | |
|---|---|
| word1 | video1(4), video2(5), video3(5) |
| word2 | video3(5) |
| word3 | video1(4), video12(45) |
| word4 | video1(40), video3(5) |
| word5 | video2(5) |

Figure 24:
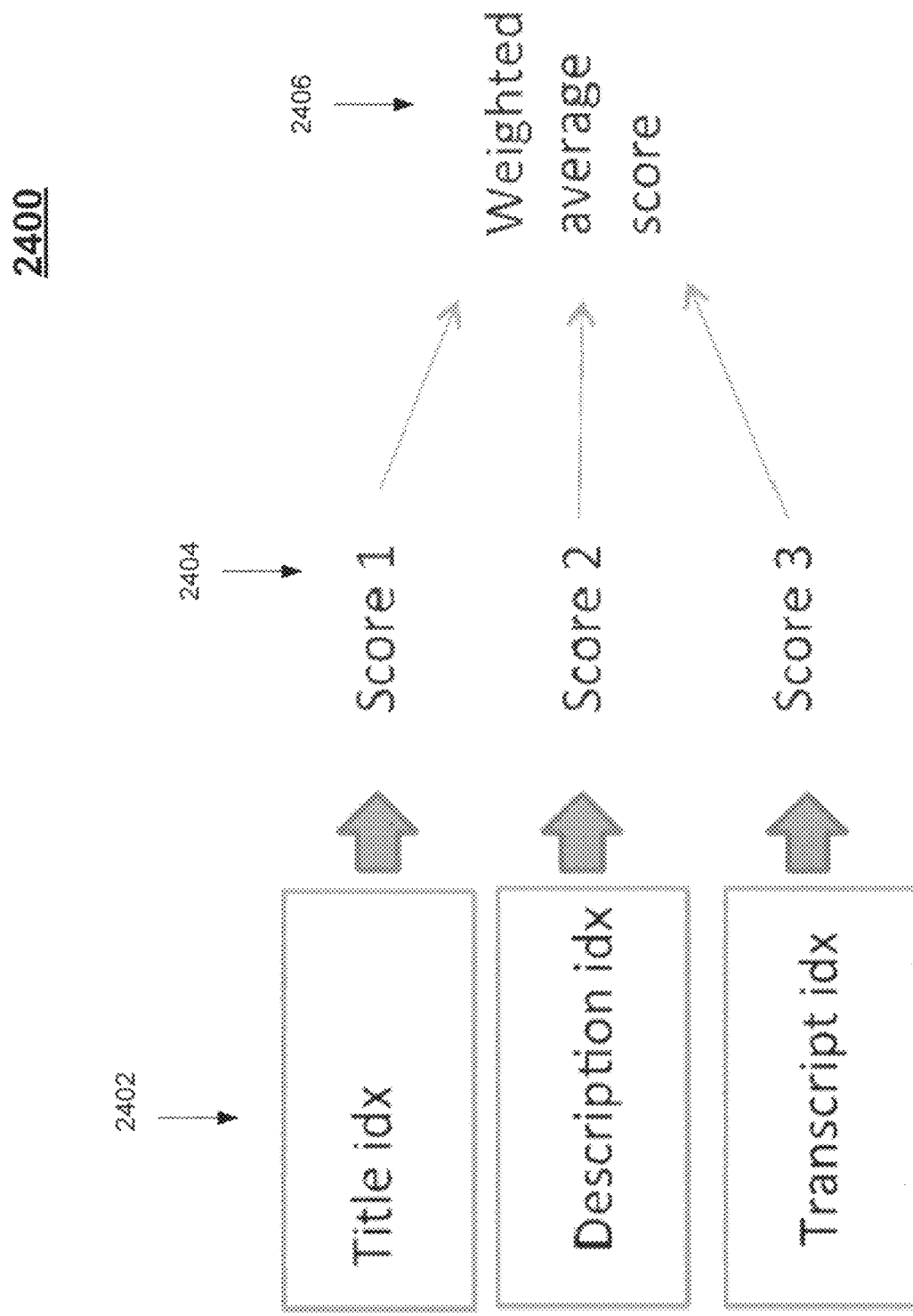
FIG. 24 is a flow diagram of a process for determining a score for the relevance process of FIG. 23 according to some embodiments.

FIG. 24 is a flow diagram of a process 2400 for determining a score for the relevance process of FIG. 23 according to some embodiments. Using known information retrieval scoring models (e.g., BM25 or Language Models or PL2), the algorithm 110 scores 2402 the indexes of FIG. 23 and determines 2404 a weighted score to rank the videos or other content.

Figure 25:
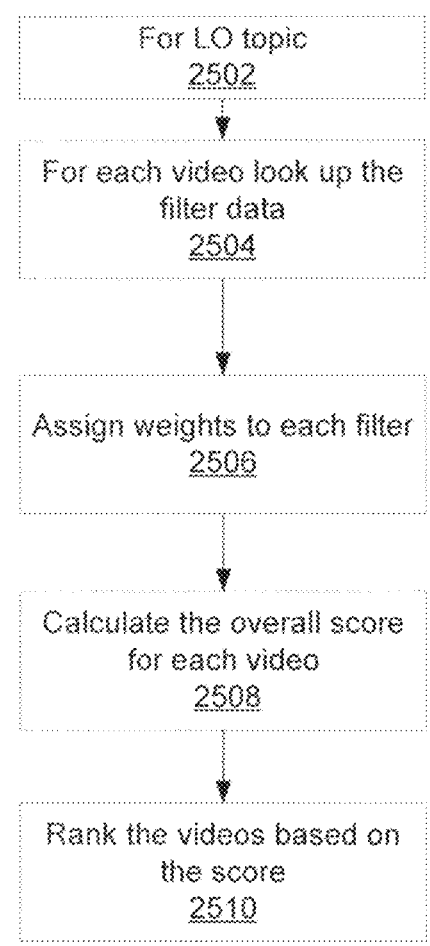
FIG. 25 is a flow diagram of a process for video filtering from content sites according to some embodiments.

FIG. 25 is a flow diagram of a process 2500 for video filtering from content sites according to some embodiments. The algorithm 110 further filters the ranked results of the process 2400 of FIG. 24 to further reduce the number of content elements that are to be associated with a learning object 206. For example, the top 10 results obtained from process 2400 are filtered again to obtain the top three or four content files that are to be associated with each learning object 206 of the map 102.

The filters may include, for example, (a) Popularity, such as video/audio/text views and up-votes/down-votes (b) Length of the content (e.g., maximums of 5-10 minutes, 10 slides, 1,000 words)

(c) Content source (reputation of the source, academic vs. professional)

(d) Source site priority (for example, quality of YouTube could be lower)

(e) Comment sentiment (positive or not), up-votes if available (f) Number of places where content has been cited or quoted (based on Search API Results)

(g) Crowd rating (if available)

(h) When the video, audio or text content was posted (freshness of the content)

The algorithm 110 may use the process 2500 for video filtering from websites that have very large numbers of videos, such as YouTube.

In some embodiments, the same algorithm is also applied for audio, slides, and text content using the filters that are available for the corresponding content type.

For each learning object topic 2502, the algorithm 110 looks up 2504 the filter data for each video. The algorithm 110 assigns 2506 weights to each filter and calculates 2508 an overall score for each video. The algorithm 110 ranks 2510 the videos based on the score.

Content Scoring

In some embodiments, the algorithm 110 ranks content on a score from 0 to 1. Following are example weights assigned to some of the algorithm filters.

$$\text{Total Score (out of 1)}=(0.1)*\text{length}+(0.2)*\text{source}+(0.2)*\text{opinion}+(0.1)*\text{time posted}+(0.3)*\text{popularity}$$

An example of how each of the filters above is calculated is next described. (the filters may be based on the type and quality of the content obtained):

Length: For video and audio clips, length is defined as length of the video or audio clip. For slides, length is the number of slides and for text length is the number of words. Here are the scores assigned to both video and audio clips based on length.

(a) Short: video or audio clip: (5-10 minutes) or text: 1,000 words or less/5 slides or less: score of 1.0

(b) Medium: video or audio clip: (11-20 minutes) or text: 5,000 words or less/10 slides or less: score of 0.8

(c) Long: video or audio clip: (20+ minutes) or text: 10,000 words are more/more than 10 slides: score of 0.5

Source: Source refers to the creator of the content. Scores are assigned as follows.

Academic/professional content: 1.0
Non-academic instructor content: 0.7
Unknown source content: 0.5

Academic/Professional Content

For example, how the algorithm 110 identifies an academic source is as follows:

(a) Channel name or video/audio title/slide title/document title contains the name of a top 100-ranked university (e.g., MIT, Stanford, or UIUC).

(b) Description of content contains the following keywords:

"Lecture"
"Professor", "prof", "Dr.," "instructor", "lecturer"
Link to "*.edu" or listed under education category (c) Channel name or video title contains the word "university"

(d) Channel name or web site address contains the suffix ".edu"

Non-academic Instructor Content

How the algorithm 110 identifies corporate content sources is as follows:

(a) Channel Name/Source has company name or the name of a person who works in the corporate world.

How the algorithm 110 identifies non-academic instructor sources is next described:

(a) If the above method fails and if the title contains "lecture" or "lec" or "chapter"

(b) Source description contains
"Lecture"
"Professor", "prof" or "Dr.", "instructor" or "lecturer"

Unknown Source Content (a) Content that is not classified as originating from an academic, professional or non-academic instructor is classified as originating from an unknown source.

Opinion: Opinions refer to the sentiments expressed in the content. The algorithm 110 uses a third-party sentiment analysis algorithm (e.g., Semant API) to extract sentiments from the comments section. The sentiments are scored between 0-1. A value 0 is considered to be negative sentiment and a value 1 is considered to be positive sentiment.

Time posted: Time posted refers to when the video was posted. Fresher content has a higher score. Scores are assigned for time in the following manner:

(a) If within past year: 1.0
(b) If between 1-3 years: 0.7
(c) If older than 3 years: 0.5

Popularity: Popularity is based on the number of views, number of up-votes and down-votes, and the ratio of up-votes to the total up-votes and down-votes. The scores are assigned in the following way:

(a) Score 1.0:
Number of views>10,000
Number of up-votes>100
up-votes/(up-votes+down-votes)>92%
(b) Score 0.8:
Number of views>5,000
Number of up-votes>50
up-votes/(up-votes+down-votes)>92%
(c) Score 0.6:
Number of views>3,000
Number of up-votes>10
up-votes/(up-votes+down-votes)>92%
(d) Score 0.4:
a. Number of views>1,000
b. Number of up-votes>2
c. up-votes/(up-votes+down-votes)>92%
(e) Score 0.2:
a. Number of views>500
(f) Score 0.0:
a. Number of views<500

Figure 26:
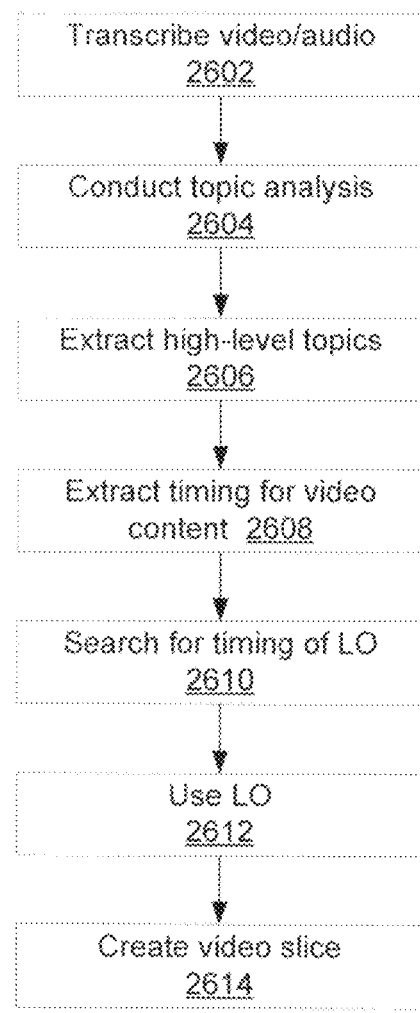
FIG. 26 is a flow diagram of a process for slicing content according some embodiments.

FIG. 26 is a flow diagram of a process 2600 for slicing content according some embodiments.

Because content crawled from the Internet is often in a longer format (greater than 10-minute video or audio, more than 1,000 words of text), the algorithm 110 slices audio and video clips that are longer than 5 minutes into smaller learning objects 206. As an illustrative example, video slicing is described. The algorithm 110 transcribes 2602 the video or audio using a transcription algorithm. The algorithm 110 conducts 2604 a topic analysis on the text (e.g., using a topic modeling tool, such as BigAR™). The algorithm 110 extracts xx06 all high-level topics from the text. The algorithm 110 extracts 2608 the timing for video content. In some embodiments, the transcription algorithm performs this extraction. The algorithm 110 searches 2610 for the first and last time a learning object topic is referenced in the video. The algorithm 110 creates 2612 learning object titles for each topical reference. The algorithm 110 creates 2614 the video slice based on when the topic is referenced for the first time and for the last time. In some embodiments, the algorithm 110 engages the Community to edit the sliced content by providing the Community the ability to engage with the full-length content so that they may correct errors made in the algorithm-driven process.

Experts Module

The experts engine 126 communicates with a community of peers and experts communicate via the experts module 106 of the platform 100 to rate the maps 102 and the learning objects 206 created by the algorithm 110. A community of peers and experts communicate via the experts module 106 of the platform 100 to rate the maps 102 and the learning objects 206 created by the algorithm 110. Over a period of time, the rating becomes the primary filter for content. Highly rated content from the platform 100 is used as a training set when new content for a learning object 206 is searched from the Internet. The characteristics of the highly-rated content, such as length of the content, author, and content media type, are used when filtering for content. Maps and answers to learner questions in the platform 100 are also subject to community ratings. Overall ratings for content, maps 102, and answers are also used to train the algorithm 110 to identify and source new content with characteristics that are similar to the popular content type.

Experts and Learners in the platform 100 may edit and re-publish existing learning objects and contribute original learning object content (both learning concept content and application content through the mobile application). New learning object content can be uploaded in multimedia, i.e., text, pictures, video and audio. The platform 100 provides content contribution templates that guide users through the process of creating a title, content summary for their content, and instructions on how to upload any multi-media (video, audio, PPT, PDF, Word Document) associated with the learning object. Learning objects edited or contributed by the community become subject to community ratings, questions and answers, and comments. Contributed or edited learning objects 206 become inputs via the experts module 106 to the algorithm 110 as the algorithm 110 continuously updates the map structure (the organization of learning objects 206, modules 204, and areas 202 within a map 102), and also inform the algorithm's content recommendations to individual learners.

Experts and learners may curate existing knowledge map structure by either rating entire maps 102, or by editing map structure. Editing maps 102 involves removing, adding, or re-arranging learning objects 206, areas 202, and modules 204 within an existing map 102. Maps 102 curated in this manner are then re-published in the platform 100. Experts and learners may also create and publish complete, original knowledge maps to the platform 100. Map editing and contribution is similarly aided by pre-determined templates provided by the platform 100.

All Community-curated and Community-contributed maps 102 and learning objects 206 (Community Content) become subject to community ratings, question and answers, and comments. The structure, content, answers, and comments associated with community content represents one category of input data that the algorithm 110 relies on to create new maps 102 and make learner recommendations. To process community content, the algorithm 110 uses filters and guidelines similar to those that govern how the algorithm 110 processes content sourced from open, internally-produced, or partner sources. Algorithm filters related to community content include content relevance, chronological age of content, community rating, and author reputation. A similar user ranking (up-vote/down-vote) system applies to community content as to content from open, internal, or partner sources. Community content may also be considered in maps 102 and learning objects 206 generated for returning users in a manner by updating the maps 102.

Q&A Module

The Q&A engine 130 incorporates learning content with the Q&A associated with the content via the Q&A module 108. All the questions come from the learners. The crowd that includes learners and experts provide the answers. All the questions and answers are rated and ranked by the crowd.

The algorithm 110 refers to the popular content from the Q&A module 108 and includes those when determining learning and use case content. The algorithm 110 creates new content by combining popular video Q&A or audio Q&A. For example, popular video answers from the crowd for a specific learning object 206 would be combined to form a new learning object. This learning object video would be shown to new users who will give their feedback in terms of rating (up-vote/down-vote), comments, questions or answers.

Recommendations

The algorithm 110 comprises a recommendation engine 132 for generating recommendations of maps 102, areas 202, modules 204, or learning objects 206 based on user input or past user behavior. In some embodiments, the platform 100 includes a recommendation algorithm to provide recommendations to learners who are not sure what they want to learn. For example, in cases where learners are interested in exploring careers, the recommendation algorithm provides recommendations based on the user's profile.

In some embodiments, a learner accesses the recommendation algorithm by logging in using an existing social network, such as LinkedIn or Facebook, or using email. If a learner uses LinkedIn, the recommendation algorithm extracts the learner's LinkedIn details. When the learner uses email or Facebook, the recommendation algorithm asks the learner to provide additional details, such as education, current career, learning interests and career goals.

The recommendation algorithm will suggest knowledge maps 102 and learning objects 206 to the learners based on their inputs, including: career goals, other professional interests, academic interests, casual learning interests.

Based on the learning objects 206 or the maps 102 a learner engages with, the algorithm 110 recommends related or sequential maps 102, areas 202, or learning objects 206 that will provide additional value to the Learner. These could be distinct, but related maps, areas 202, or learning objects 206, or, they could be areas 202, or learning objects 206 within a particular map 102.

Measurement and Assessment

The assessment engine 128 of the algorithm 110 measures every aspect of the learner and expert interaction with the platform and with each other to improve the ability of the platform 100. The assessment may be individual assessment, such as passive assessment, and active assessment.

For passive assessment, the algorithm 110 automatically tracks aspects of user behavior correlated to knowledge or skill mastery. Key metrics include: number of learning objects 206 per map 102 viewed, time spent viewing a learning object 206, number of answers to community or group questions submitted per learning object 206, and number of repeat visits to a particular learning object 206. By aggregating these measurements and recognizing patterns across user groups, the algorithm 110 can estimate a learner or expert's engagement and progress in the platform 100.

For active assessment, learners who want to proactively track their mastery and retention and allow others to also track their improvement can engage active assessment features in the platform 100. These include, but are not limited to:

Quizzes. Quizzes test mastery of learning object content. Quiz questions may be generated by community members or sourced from either partners or fair use websites. Quizzes are then generated automatically or, hand-curated by the platform administrators or by community members. Automatic quiz generation is done in the following ways: (i) The highly ranked questions for each of the learning objects 206 are provided as quiz questions (ii) Quiz content related to the learning objects 206 is crawled from the Internet and a filtering algorithm similar to the learning objects filtering algorithm (such as the process of FIG. 22) is used to extract quiz content.

Projects: In order to test functional knowledge of a given learning objects 206 or series of learning objects 206, the platform 100 presents realistic projects to learners or to small learner groups. Projects are assessed by other experts, either community members or guest members from partner organizations. Projects may originate from experts in the community, from open sources, from internal staff, or from partner organizations.

Own Words: To establish a basic level of comprehension and mastery, the platform 100 includes an assessment method "Own Words" which entails learners writing or recording their own understanding of the fundamental meaning and application of principles and concepts portrayed in learning objects 206. Responses are critiqued by experts in the community.

The data collected by passive and active assessment methodologies populate databases that generate detailed user profiles. The accuracy of these profiles in portraying the knowledge and skills mastery of the learner or expert increases as the user stays longer on the platform 100 and engages with greater frequency and with a greater number of learning object content. This enables third parties (e.g., instructors, mentors, recruiters, and employers) to more effectively assess the proficiency of the user. Another benefit of measurement and assessment methodologies is that it enables the algorithm 110 to more effectively personalize learning content and Map structure to each user.

Recent open-source distributed database solutions like Blockchain or the derivative forms of this solution, Altchains are based on the concept of community verification of tamper-proof metatag information. These solutions may be used to increase accuracy in learner assessment, accurately track learner achievement, attribute authorship of original answers and content contributed to the platform 100, and verify submitted answers and responses as authentic to the stated user. Block, and Altchains have application to multiple use cases in the platform 100, including: learner responses to assessment prompts (via quizzes, projects, own words, etc.), learner answers to questions, expert answers to questions, expert learning objects content contributions, and expert map curation and creation. The results of implementing such a solution potentially enhances dataset quality to improve algorithm 110 results. Another application is as a monetization platform for demand-driven content. In this application, learner demand for expert-generated content determines the price of the content and in which payments from learners to access content are shared with expert content creators. Because blockchain and altchain solutions are based on distributed, rather than centralized verification, another potential benefit is lower central administration costs.

Personalized Learning

Effective learning is accomplished when learning is personalized to the individual needs of the Learner. The algorithm 110 provides personalization to learners and instructors using the platform in the following ways:

(1) Each map 102 can be personalized based on general learning subject, academic major, academic course. Maps 102 can also be personalized based on career role, company, or industry. These interests are captured the first time a user signs up and creates a profile on the platform and the interests can be changed at any time by the user. The map data may show specific areas 202, modules 204, and learning objects 206 based on the expressed interests of each learner.

(2) Maps 102 may also be personalized based on relevant learner experience related to any given map 102.

(3) Knowledge Maps 102 and content in the platform 100 are localized to the country, state, or region of the learner. The content crawled will be localized (Algorithm 110 provides localization.)

(4) All the clicks on the mobile or web application are stored in a database. Based on these clicks, the algorithm 110 learns about the following preferences of the learners and provides a personalized learning experience:

(a) Preferred media of learning (audio, video, text, pictures). Based on the preferences collected, learners are shown personalized content according to their media and content interests.

(b) Preferred media to ask/answer questions or read questions/answers (c) Language preferences. Learners are shown personalized content in their preferred language.

(d) Time required by learner to master each area 202, learning object 206 or map 102, based on the time taken by the learner historically. Learners are provided with metrics comparing them to their peers that indicate how long it takes to master a particular area 202, learning object 206 or map 102.

(e) Frequency of engagement. Based on how often learners interact with certain content, recommendations are given to them related to what content they may be interested in, or how to more effectively improve their progress toward mastery.

(f) Time of the day when learner engages. Time of the day is used to provide metrics to the users on when they are more productive in learning.

(g) Content and Q&A ratings provided by the learner and the ratings received by the learner for the content and Q&A provided by them. Ratings are used to determine the quality of the content and Q&A.

(5) The Map structure and learning object content in the platform 100 is also influenced by learner assessment. Based on learner assessment:

(a) A learner is presented with more or less challenging content so that the difficulty level of content matches their learning needs.

(b) The platform 100 presents the learner with content that builds on the historical learning of pre-requisites. If a learner does not have the prerequisites, these will be presented as part of the learning object 206 sequence.

In addition to using the platform 100 for personalized learning, users may use the platform 100 to create customized or personalized curriculum using educational, instructional or training material from numerous sources. For example, freelance online instructors, corporate trainers, and underserved teachers around the world who lack access to quality instructional content and expert/peer community can use the platform 100 to build a complete curriculum and plug their class/followers into a global community of experts, peers, and mentors right from their mobile device or laptop.

Knowledge Map and Learning Content Update

The platform 100 constantly updates the structure of maps 102 and learning objects 206 as new careers, subjects, and learning content are created on the Internet, as new content is input into the platform 100 by experts or learners, and as partner organizations add content to specific maps 102. The map structure and learning object content is persistently updated and refreshed so that each map 102 and learning object 206 reflects the latest, state-of-the-art innovation in any field. Similarly, career skills are updated as careers and related skills evolve.

Versions of the knowledge map 102 and learning object content are stored in the database 112 as they are updated. Each version contains a list of users using the map 102 and the LO content. The user experience as the knowledge map 102 and learning objects are updated is next described.

When a new user signs into the platform 100 and begins to explore the maps 102 and the learning objects 206, the platform 100 shows the user the latest version of the specific the maps 102 or the learning objects 206 for which that user searched.

A returning user is next described. If a user has started learning a knowledge map 102, then the user is always shown the same portions of the knowledge map 102 they initially engaged with in order to maintain consistency throughout the learning experience. However, the learner is also invited to view new knowledge maps 102 associated with a map title. 1) The learner is informed that a new map 102 is available by an icon that invites them to update the map 102. 2) New content (learning objects 206) is added to (grafted onto) existing maps 102 and highlighted visually. The learner is given the option to archive the original knowledge map 102 and access the new map 102.

Similarly, if a returning user has viewed a learning object 206, then the Learner will always be shown the learning object content the learner previously viewed. However, if that learning object 206 has been replaced in the new maps 102 with a more recent, higher-rated learning object 206, the Learner will be notified of this new content and the Learner will be provided a way to view the new content. The platform 100 may include an icon-based indicator that new content is available for a learning object 206 and/or a button to refresh the learning object 206 and replace the initial learning object 206 with the new learning object 206.

Learning Object Content is updated based on the following rules:

(1) For every learning object 206, the algorithm 110 constantly crawls content data sources. For all new content (videos, audio, text) found by the algorithm 110, the algorithm 110 sources the content and performs all the relevant filters to extract the best content.

(2) Experts participating in the platform 100 can suggest new content from the Internet. This content also undergoes the same checks that are applied to content crawled by the content algorithm 110.

(3) Experts can upload their own content into the algorithm 110. This content goes through the topic relevance checks and certain content filtering checks like reputation of the author, length of the content, and previous ratings of the Experts.

(4) Any new content found using the above methods is be stored in the database and compared against existing content.

(5) If the existing content does not have sufficient up-votes, then the existing content is replaced with new content. Sufficient up-votes is defined by the following: number of Up-votes/Number of unique views>10%. This percentage threshold may change. Alternately, lower-ranked content may be quickly accessed by a simple user navigation such as up, or down-swiping, or viewing a scrolling feed of LO content.

(6) If the existing content has sufficient up-votes, the algorithm 110 will randomly show new content to new users to establish social proof for the new content.

The structure of maps 102 is updated in one of the following ways:

(1) The algorithm 110 constantly crawls for new job descriptions for each career, new subjects from universities, or other online learning communities like Khan Academy, and new syllabi from universities, partner databases, or online subject-based communities. New maps 102 are created when new content is found to generate a map 102 in which more than 10% of the map 102 is different compared with the original map 102. The percentage difference between the maps 102 is calculated as the number of titles in the maps 102 that are different plus the number of learning objects 206 with different content divided by the total number of Map titles plus the total number of learning object content.

(2) Experts on the platform 100 can edit the structure and sequencing of learning objects 206 in maps 102 to update them.

(3) When maps 102 are updated in either of the above ways, the algorithm 110 checks the maps 102 to see if the learning object content within the map 102 has changed more than 10% (calculated by comparing all the individual elements in a map 102). If a map 102 has changed more than 10%, then the algorithm 110 creates a new map 102.

(4) If the old map 102 does not have sufficient up-votes (Number of Up-votes/Number of unique views>10%), then the new map 102 is shown to new users and legacy users are given the option to archive and refresh the maps 102.

(5) If the old map 102 has sufficient up-votes to remain the default maps 102, the new map 102 is shown to the new users randomly to build social proof for the new map 102.

(6) The algorithm 110 identifies areas 202 and learning objects 206 in the new map 102 that are new relative to the original map 102.

(7) Every new map 102 follows the same steps of acceptance to be displayed to the users.

Hardware

FIG. 27 is a block diagram illustrating hardware of a special purpose computing machine configured for the processes described herein. The following hardware description is merely one example. It is to be understood that a variety of computers topologies may be used to implement the above described techniques. An example computer system 2710 is illustrated in FIG. 27. Computer system 2710 includes a bus 2705 or other communication mechanism for communicating information, and one or more processor(s) 2701 coupled with bus 2705 for processing information. Computer system 2710 also includes a memory 2702 coupled to bus 2705 for storing information and instructions to be executed by processor 2701, including information and instructions for performing some of the techniques described above, for example. This memory may also be used for storing programs executed by processor 2701. Possible implementations of this memory may be, but are not limited to, random access memory (RAM), read only memory (ROM), or both. A storage device 2703 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 2703 may include source code, binary code, or software files for performing the techniques above, for example. Storage device and memory are both examples of non-transitory computer readable storage mediums.

Computer system 2710 may be coupled via bus 2705 to a display 2712 for displaying information to a computer user. An input device 2711 such as a keyboard, touchscreen, and/or mouse is coupled to bus 2705 for communicating information and command selections from the user to processor 2701. The combination of these components allows the user to communicate with the system. In some systems, bus 2705 represents multiple specialized buses, for example.

Computer system 2710 also includes a network interface 2704 coupled with bus 2705. Network interface 2704 may provide two-way data communication between computer system 2710 and a local network 2720. The network interface 2704 may be a wireless or wired connection, for example. Computer system 2710 can send and receive information through the network interface 2704 across a local area network, an Intranet, a cellular network, or the Internet, for example. One example implementation may include a browser executing on a computing system 2710 for autonomous creation of personalized, self-updating curricula and the use thereof as described above. In the Internet example, a browser, for example, may access data and features on backend systems that may reside on multiple different hardware servers 2731-2735 across the network. Servers 2731-2735 and server applications may also reside in a cloud computing environment, for example.

Reference in the specification to "one embodiment", "an embodiment", "various embodiments" or "some embodiments" means that a particular feature, structure, or characteristic described in connection with these embodiments is included in at least one embodiment of the invention, and such references in various places in the specification are not necessarily all referring to the same embodiment.

All publications, patents, and patent applications cited herein are hereby incorporated by reference in their entirety for all purposes to the same extent as if each individual publication, patent, or patent application were specifically and individually indicated to be so incorporated by reference. To the extent that section headings are used, they should not be construed as necessarily limiting.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

The use of the terms "top", "bottom", "left" and "right" are for convenience and are not to be construed as limiting.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Also, as used in the description herein and throughout the claims that follow, the meaning of "on" includes "in" and "on" unless the context clearly dictates otherwise.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer-implemented method for automatically generating a curriculum, the method comprising:
   using at least a first and a second machine learning model that is trained on extracted keywords that are classified from one or more source databases,
   wherein at least the first machine learning model is configured to:
      receive a user input related to a subject matter for learning;
      search one or more databases for keywords of material related to the user input; and
      generate knowledge areas based on the keywords of the material from the search;
   wherein at least the second machine learning model is configured to receive the keywords output from at least the first machine learning model as input and to:
      search the one or more databases for content related to the keywords, and
      extract modules that include material related to the user input in response to the generated knowledge areas;
   wherein one or more algorithms are configured to receive the extracted modules as input and to:
      create semantic vectors that define a relationship between each extracted module and a knowledge area; and
      populate a map with the knowledge areas and the extracted modules; and
      associate, in the map, the extracted modules with one or more knowledge areas based on the defined relationships.

2. The computer-implemented method of claim 1, wherein the subject matter for learning comprises one of: a career, a job, or a role, such that the extracted keywords are extracted from at least one of: job descriptions or job postings.

3. The computer-implemented method of claim 2, wherein the second machine learning model is further configured to search at least one of: the job descriptions or the job postings for keywords related to the career, the job, or the role; and extract modules associated with the searched career, the searched job, or the searched role.

4. The computer-implemented method of claim 2, wherein the keywords of the material comprise skill training sets related to the career, the job, or the role.

5. The computer-implemented method of claim 4, further comprising using an algorithm to rank each of the skill training sets based on a determined importance of each skill training set to the career, the job, or the role.

6. The computer-implemented method of claim 5, further comprising using the one or more algorithms to populate the map with a plurality of the skill training sets based on the ranking, wherein the map comprises a career map, a job map, or a role map.

7. The computer-implemented method of claim 1, further comprising:
   comparing two or more modules to determine similarity between the two or more modules; and
   merging the two or more modules if the similarity exceeds a threshold, or
   populating the map with the knowledge areas and the two or more modules if the similarity does not exceed the threshold.

8. A system for automatically generating a curriculum, the system comprising:
   a processor; and
   a memory, coupled to the processor, configured to store program instructions, wherein, when executed by the processor, the program instructions cause the processor to perform a method comprising:
   via a first machine learning model that is trained on extracted keywords that are classified from one or more source databases, wherein the first machine learning model is configured to:
      receive a user input related to a subject matter for learning,
      search one or more databases for keywords of material related to the user input, and
      generate knowledge areas based on the keywords of the material from the search;
   via a second machine learning model that is trained on the extracted keywords that are classified from the one or more source databases, wherein the second machine learning model is configured to receive the keywords output from the first machine learning model as input and to:
      search the one or more databases for content related to the keywords, and
      extract modules that include material related to the user input in response to the generated knowledge areas; and
   via one or more algorithms configured to receive the extracted modules as input and to:
      compare two or more extracted modules to determine similarity between the two or more extracted modules; and
      merge the two or more extracted modules if the similarity exceeds a threshold, or populate a map with the knowledge areas and the two or more extracted modules if the similarity does not exceed the threshold; and
      associate, in the map, the extracted modules with one or more knowledge areas.

9. The system of claim 8, wherein the subject matter for learning comprises at least one of: a career, a job, or a role, such that the extracted keywords are extracted from at least one of: job descriptions or job postings.

10. The system of claim of claim 9, wherein the second machine learning module is further configured to search at least one of: the job descriptions or the job postings for keywords related to the career, the job, or the role; and extract modules associated with the searched career, the searched job, or the searched role.

11. The system of claim of claim 9, wherein the keywords of the material comprise skill training sets related to the career, the job, or the role.

12. The system of claim 11, further comprising using an algorithm to rank each of the skill training sets based on a determined importance of each skill training set to the career, the job, or the role.

13. The system of claim 12, further comprising using the one or more algorithms to populate the map with a plurality of the skill training sets based on the ranking, wherein the map comprises a career map, a job map, or a role map.

14. The system of claim 8, further comprising:
creating semantic vectors that define a relationship between each module and a knowledge area; and
associating, in the map, the modules with the one or more knowledge areas based on the defined relationships.

15. A non-transitory computer-readable medium encoded with instructions, that when executed by one or more processors, cause the one or more processors to carry out a method for automatically generating a curriculum, the method comprising:
using at least a first and a second machine learning model that is trained on extracted keywords that are classified from one or more source databases, wherein at least the first machine learning model is configured to:
receive a user input related to a subject matter for learning,
search one or more databases for keywords of material related to the user input, and
generate knowledge areas based on the keywords of the material from the search;
wherein at least the second machine learning model is configured to receive the keywords output from at least the first machine learning model as input and to:
search the one or more databases for content related to the keywords, and
extract modules that include material related to the user input in response to the generated knowledge areas; and
wherein one or more algorithms are configured to receive the extracted modules as input and to:
compare two or more extracted modules to determine similarity between the two or more extracted modules; and
merge the two or more extracted modules if the similarity exceeds a threshold, or populate a map with the knowledge areas and the two or more extracted modules if the similarity does not exceed the threshold; and
associate, in the map, the extracted modules with one or more knowledge areas.

16. The non-transitory computer-readable medium of claim 15, wherein the subject matter for learning comprises at least one of: a career, a job, or a role, such that the extracted keywords are extracted from at least one of: job descriptions or job postings.

17. The non-transitory computer-readable medium of claim 16, wherein the keywords of the material comprise skill training sets related to the career, the job, or the role.

18. The non-transitory computer-readable medium of claim 17, further comprising using an algorithm to rank each of the skill training sets based on a determined importance of each skill training set to the career, the job, or the role; and using the one or more algorithms to populate the map with a plurality of the skill training sets based on the ranking, wherein the map comprises a career map, a job map, or a role map.

* * * * *